(12) United States Patent
Landman

(10) Patent No.: US 12,288,060 B2
(45) Date of Patent: Apr. 29, 2025

(54) DATA FILE PARTITION AND REPLICATION

(71) Applicant: JFROG LTD., Netanya (IL)

(72) Inventor: Yoav Landman, Netanya (IL)

(73) Assignee: JFrog Ltd., Netanya (IL)

( * ) Notice: Subject to any disclaimer, the term of this patent is extended or adjusted under 35 U.S.C. 154(b) by 201 days.

(21) Appl. No.: 18/305,247

(22) Filed: Apr. 21, 2023

(65) Prior Publication Data

US 2023/0305837 A1 Sep. 28, 2023

Related U.S. Application Data

(63) Continuation of application No. 17/727,126, filed on Apr. 22, 2022, now Pat. No. 11,726,777, which is a continuation of application No. 16/399,953, filed on Apr. 30, 2019, now Pat. No. 11,340,894.

(51) Int. Cl.
*G06F 8/71* (2018.01)
*G06F 8/65* (2018.01)
*G06F 16/178* (2019.01)

(52) U.S. Cl.
CPC .............. *G06F 8/71* (2013.01); *G06F 8/65* (2013.01); *G06F 16/178* (2019.01)

(58) Field of Classification Search
None
See application file for complete search history.

(56) References Cited

U.S. PATENT DOCUMENTS

| | | |
|---|---|---|
| 5,671,282 A | 9/1997 | Wolff et al. |
| 5,915,238 A | 6/1999 | Tjaden |
| 5,931,946 A | 8/1999 | Terada et al. |
| 6,604,236 B1 | 8/2003 | Draper et al. |
| 6,802,061 B1 | 10/2004 | Parthasarathy et al. |
| 7,007,042 B2 | 2/2006 | Lubbers et al. |

(Continued)

FOREIGN PATENT DOCUMENTS

WO WO-2012153173 A2 11/2012

OTHER PUBLICATIONS

Carbunaru et al., "A Performance Study of Peer-assisted File Distribution with Heterogeneous Swarms," IEEE, 2011, 9pg. (Year: 2011).*

(Continued)

*Primary Examiner* — Ryan D. Coyer
(74) *Attorney, Agent, or Firm* — Norton Rose Fulbright US LLP

(57) ABSTRACT

The present disclosure provides a method, system, and device for file replication. To illustrate, based on target replication information corresponding to a version of a file at a target device, a source device may determine one or more portions of a different version of the file at the source device to be provided to the target device. One or more other aspects of the present disclosure further provide sending, to the target device, the one or more portions and replication information corresponding to the version of the file at the source device. Based on the version of the file at the target (Continued)

device, the one or more portions, and the replication information corresponding to the version of the file at the source device, the target device may assemble and store a file that corresponds to the version of the file at the source device.

27 Claims, 8 Drawing Sheets

(56) References Cited

U.S. PATENT DOCUMENTS

| | | | |
|---|---|---|---|
| 7,403,901 B1 | 7/2008 | Carley et al. | |
| 7,464,158 B2 | 12/2008 | Albornoz | |
| 7,685,148 B2 | 3/2010 | Engquist et al. | |
| 7,814,146 B2 | 10/2010 | Chavez et al. | |
| 7,987,368 B2 | 7/2011 | Zhu et al. | |
| 8,036,140 B2 | 10/2011 | Rao et al. | |
| 8,131,838 B2 | 3/2012 | Bornhoevd et al. | |
| 8,196,186 B2 | 6/2012 | Mityagin et al. | |
| 8,239,446 B2 | 8/2012 | Navar et al. | |
| 8,316,364 B2* | 11/2012 | Stein | H04L 67/34 717/172 |
| 8,364,758 B2 | 1/2013 | Hydrie et al. | |
| 8,413,198 B2 | 4/2013 | Connor et al. | |
| 8,510,571 B1 | 8/2013 | Chang et al. | |
| 8,688,803 B2 | 4/2014 | Manion et al. | |
| 8,839,224 B2* | 9/2014 | Adler | H04L 67/10 717/178 |
| 9,009,820 B1 | 4/2015 | McDougal et al. | |
| 9,053,124 B1 | 6/2015 | Dornquast et al. | |
| 9,280,339 B1 | 3/2016 | Prunicki et al. | |
| 9,635,107 B2 | 4/2017 | Souza et al. | |
| 9,659,155 B2 | 5/2017 | Kosovan | |
| 9,805,056 B2 | 10/2017 | Parkison et al. | |
| 9,819,665 B1 | 11/2017 | Machani | |
| 9,842,062 B2 | 12/2017 | Ford et al. | |
| 9,946,531 B1 | 4/2018 | Fields et al. | |
| 10,043,026 B1 | 8/2018 | Salour et al. | |
| 10,091,215 B1 | 10/2018 | Word | |
| 10,146,788 B1 | 12/2018 | Weatherall et al. | |
| 10,216,757 B1 | 2/2019 | Armangau et al. | |
| 10,339,299 B1 | 7/2019 | Magnuson et al. | |
| 10,387,369 B1 | 8/2019 | Davenport et al. | |
| 10,409,838 B1 | 9/2019 | George et al. | |
| 10,540,173 B2 | 1/2020 | Patton et al. | |
| 10,552,138 B2 | 2/2020 | Smith et al. | |
| 10,701,143 B1 | 6/2020 | Jha et al. | |
| 10,719,369 B1 | 7/2020 | Aithal et al. | |
| 10,754,952 B2 | 8/2020 | Muller et al. | |
| 10,785,334 B2 | 9/2020 | Kristiansson et al. | |
| 10,809,932 B1 | 10/2020 | Armangau et al. | |
| 10,812,975 B1 | 10/2020 | Easwar Prasad et al. | |
| 10,880,150 B1 | 12/2020 | Farber et al. | |
| 10,880,407 B2 | 12/2020 | Reynolds et al. | |
| 10,911,337 B1 | 2/2021 | De Kosnik et al. | |
| 10,986,387 B1 | 4/2021 | Parulkar et al. | |
| 11,048,590 B1 | 6/2021 | Sapuntzakis et al. | |
| 11,064,323 B2 | 7/2021 | Esselink et al. | |
| 11,106,554 B2 | 8/2021 | Landman | |
| 11,921,595 B2 | 3/2024 | Sekar et al. | |
| 2002/0062439 A1 | 5/2002 | Cotugno et al. | |
| 2002/0156893 A1 | 10/2002 | Pouyoul et al. | |
| 2002/0198920 A1 | 12/2002 | Resnick et al. | |
| 2003/0191955 A1 | 10/2003 | Wagner et al. | |
| 2003/0220880 A1 | 11/2003 | Lao et al. | |
| 2004/0030731 A1 | 2/2004 | Iftode et al. | |
| 2004/0054764 A1 | 3/2004 | Aderton et al. | |
| 2004/0064722 A1 | 4/2004 | Neelay et al. | |
| 2004/0181561 A1 | 9/2004 | Knox et al. | |
| 2004/0250115 A1 | 12/2004 | Gemmel et al. | |
| 2004/0267807 A1 | 12/2004 | Barabas et al. | |
| 2005/0055386 A1 | 3/2005 | Tosey | |
| 2005/0071385 A1 | 3/2005 | Rao | |
| 2005/0132348 A1 | 6/2005 | Meulemans et al. | |
| 2006/0107286 A1 | 5/2006 | Connor et al. | |
| 2006/0136547 A1 | 6/2006 | Neuhaus et al. | |
| 2006/0195816 A1 | 8/2006 | Grandcolas et al. | |
| 2006/0236392 A1 | 10/2006 | Thomas et al. | |
| 2006/0259967 A1 | 11/2006 | Thomas et al. | |
| 2007/0169199 A1 | 7/2007 | Quinnell et al. | |
| 2007/0220575 A1 | 9/2007 | Cooper et al. | |
| 2007/0294686 A1 | 12/2007 | Oh | |
| 2008/0005113 A1 | 1/2008 | Li | |
| 2008/0005120 A1 | 1/2008 | Li | |
| 2008/0082648 A1 | 4/2008 | Ahmed et al. | |
| 2008/0163374 A1 | 7/2008 | Rogers et al. | |
| 2008/0178287 A1 | 7/2008 | Akulavenkatavara et al. | |
| 2008/0209414 A1* | 8/2008 | Stein | H04L 67/34 718/1 |
| 2008/0294860 A1 | 11/2008 | Stakutis et al. | |
| 2009/0013317 A1 | 1/2009 | Abfalter et al. | |
| 2009/0083812 A1 | 3/2009 | Tang | |
| 2009/0119655 A1 | 5/2009 | Quilty | |
| 2009/0144340 A1 | 6/2009 | Ferguson et al. | |
| 2009/0271412 A1 | 10/2009 | Lacapra et al. | |
| 2009/0290715 A1 | 11/2009 | Mityagin et al. | |
| 2009/0313353 A1 | 12/2009 | Lou | |
| 2010/0185614 A1 | 7/2010 | O'Brien et al. | |
| 2010/0217694 A1 | 8/2010 | Knighton | |
| 2010/0223472 A1 | 9/2010 | Alvarsson | |
| 2010/0287363 A1 | 11/2010 | Thorsen | |
| 2011/0010258 A1 | 1/2011 | Chavez et al. | |
| 2011/0010421 A1 | 1/2011 | Chavez et al. | |
| 2011/0071841 A1 | 3/2011 | Fomenko et al. | |
| 2011/0072075 A1 | 3/2011 | Gautier | |
| 2011/0107419 A1 | 5/2011 | Vidal et al. | |
| 2011/0113012 A1 | 5/2011 | Gruhl et al. | |
| 2011/0225311 A1 | 9/2011 | Liu et al. | |
| 2011/0307564 A1 | 12/2011 | Luo et al. | |
| 2012/0072763 A1 | 3/2012 | Lu et al. | |
| 2012/0090025 A1 | 4/2012 | Milner et al. | |
| 2012/0131566 A1 | 5/2012 | Morgan et al. | |
| 2012/0151051 A1 | 6/2012 | Zhang et al. | |
| 2012/0151245 A1 | 6/2012 | Chang et al. | |
| 2012/0159469 A1 | 6/2012 | Laor | |
| 2012/0210312 A1 | 8/2012 | Ma et al. | |
| 2012/0222112 A1 | 8/2012 | DiFalco et al. | |
| 2012/0233134 A1 | 9/2012 | Barton et al. | |
| 2012/0240096 A1 | 9/2012 | Sass | |
| 2012/0240236 A1 | 9/2012 | Wyatt et al. | |
| 2012/0259920 A1 | 10/2012 | Mathieu et al. | |
| 2012/0297405 A1 | 11/2012 | Zhang et al. | |
| 2013/0061216 A1* | 3/2013 | Adler | G06F 1/1643 717/173 |
| 2013/0073727 A1 | 3/2013 | Souza et al. | |
| 2013/0081100 A1 | 3/2013 | Sreehari et al. | |
| 2013/0124807 A1 | 5/2013 | Nielsen et al. | |
| 2013/0132946 A1 | 5/2013 | Ma | |
| 2013/0268927 A1 | 10/2013 | Cochran | |
| 2013/0326481 A1 | 12/2013 | Kannan | |
| 2013/0326494 A1 | 12/2013 | Nunez | |
| 2014/0172972 A1 | 6/2014 | Burba et al. | |
| 2014/0173024 A1 | 6/2014 | Burba et al. | |
| 2014/0223424 A1* | 8/2014 | Han | G06F 8/60 717/173 |
| 2014/0245376 A1 | 8/2014 | Hibbert et al. | |
| 2014/0280457 A1 | 9/2014 | Anton et al. | |
| 2014/0373160 A1 | 12/2014 | Shigemoto et al. | |
| 2015/0003296 A1 | 1/2015 | Fan et al. | |
| 2015/0088992 A1 | 3/2015 | Loannidis et al. | |
| 2015/0099510 A1 | 4/2015 | Shah et al. | |
| 2015/0172352 A1 | 6/2015 | Gopalakrishnan et al. | |
| 2015/0180893 A1 | 6/2015 | Im et al. | |
| 2015/0268881 A1 | 9/2015 | Nielsen et al. | |
| 2015/0301823 A1 | 10/2015 | Hatakeyama | |
| 2015/0302037 A1 | 10/2015 | Jackson et al. | |
| 2015/0312243 A1 | 10/2015 | Ponsford et al. | |
| 2015/0317145 A1 | 11/2015 | Katariya et al. | |
| 2015/0341178 A1 | 11/2015 | Tanaka et al. | |
| 2015/0341325 A1 | 11/2015 | Al Jabri | |
| 2015/0350186 A1 | 12/2015 | Chan et al. | |
| 2016/0006837 A1 | 1/2016 | Reynolds et al. | |
| 2016/0117235 A1 | 4/2016 | Mishra et al. | |
| 2016/0124665 A1 | 5/2016 | Jain et al. | |

(56) References Cited

U.S. PATENT DOCUMENTS

| | | |
|---|---|---|
| 2016/0164900 A1 | 6/2016 | Pericin |
| 2016/0179867 A1 | 6/2016 | Li et al. |
| 2016/0182494 A1 | 6/2016 | Lissounov et al. |
| 2016/0182556 A1 | 6/2016 | Tatourian et al. |
| 2016/0234237 A1 | 8/2016 | Thakar et al. |
| 2016/0266890 A1 | 9/2016 | Aleksandrov et al. |
| 2016/0267101 A1 | 9/2016 | Clissold et al. |
| 2016/0299835 A1 | 10/2016 | Jain et al. |
| 2016/0344834 A1 | 11/2016 | Das |
| 2016/0373440 A1 | 12/2016 | Mather et al. |
| 2017/0003951 A1 | 1/2017 | Newell et al. |
| 2017/0034023 A1 | 2/2017 | Nickolov et al. |
| 2017/0060546 A1 | 3/2017 | Prasad et al. |
| 2017/0147338 A1 | 5/2017 | Jackson et al. |
| 2017/0177445 A1 | 6/2017 | Lai et al. |
| 2017/0262657 A1 | 9/2017 | Salmon-Legagneur et al. |
| 2017/0264588 A1 | 9/2017 | Hunt et al. |
| 2017/0300309 A1 | 10/2017 | Berger et al. |
| 2017/0353933 A1 | 12/2017 | Xhafa et al. |
| 2017/0357496 A1 | 12/2017 | Smith et al. |
| 2017/0357807 A1 | 12/2017 | Harms et al. |
| 2017/0371499 A1 | 12/2017 | Checkley et al. |
| 2018/0095993 A1 | 4/2018 | Clark |
| 2018/0136923 A1 | 5/2018 | Xiao |
| 2018/0189043 A1 | 7/2018 | Habayeb |
| 2018/0240546 A1 | 8/2018 | Pfeiffer |
| 2018/0260212 A1 | 9/2018 | Wisnovsky |
| 2018/0373517 A1 | 12/2018 | Hu |
| 2019/0014161 A1 | 1/2019 | Doar et al. |
| 2019/0050255 A1 | 2/2019 | Chagam Reddy |
| 2019/0050576 A1 | 2/2019 | Boulton |
| 2019/0080080 A1 | 3/2019 | Ogura et al. |
| 2019/0130114 A1 | 5/2019 | Smith et al. |
| 2019/0138287 A1 | 5/2019 | De Capoa et al. |
| 2019/0141163 A1 | 5/2019 | Markham et al. |
| 2019/0205121 A1 | 7/2019 | Ericson |
| 2019/0305957 A1 | 10/2019 | Reddy et al. |
| 2019/0306173 A1 | 10/2019 | Reddy et al. |
| 2019/0332367 A1 | 10/2019 | Navarrete Michelini et al. |
| 2019/0379723 A1 | 12/2019 | Demasi et al. |
| 2020/0012441 A1 | 1/2020 | Chheda et al. |
| 2020/0026857 A1 | 1/2020 | Muller et al. |
| 2020/0034132 A1 | 1/2020 | U et al. |
| 2020/0084202 A1 | 3/2020 | Smith et al. |
| 2020/0162543 A1 | 5/2020 | Mosko et al. |
| 2020/0177397 A1 | 6/2020 | Harrington |
| 2020/0186505 A1 | 6/2020 | Amar et al. |
| 2020/0213144 A1 | 7/2020 | Maloy |
| 2020/0252207 A1 | 8/2020 | Hanel et al. |
| 2020/0351089 A1 | 11/2020 | Wentz |
| 2020/0372183 A1 | 11/2020 | Rangaiah et al. |
| 2020/0409986 A1 | 12/2020 | Soroushian et al. |
| 2020/0412691 A1 | 12/2020 | Shribman et al. |
| 2021/0200834 A1 | 7/2021 | Adams et al. |
| 2021/0218800 A1 | 7/2021 | Landman |
| 2021/0234749 A1 | 7/2021 | Vazirani et al. |
| 2021/0263911 A1 | 8/2021 | Gamiz et al. |
| 2021/0304142 A1 | 9/2021 | Bar-On et al. |
| 2023/0117273 A1* | 4/2023 | Giri .................. H04L 67/1076 709/203 |
| 2023/0289368 A1 | 9/2023 | Boshev et al. |

OTHER PUBLICATIONS

Dale et al., "apt-p2p: A Peer-to-Peer Distribution System for Software Package Releases and Updates," IEEE, 2009, 9pg. (Year: 2009).*

Somani et al., "BitTorrent for Large Package Distribution in the Enterprise Environment," IEEE, 2012, 6pg. (Year: 2012).*

H. B. Hadj Abdallah and W. Louati, "Ftree-CDN: Hybrid CDN and P2P Architecture for Efficient Content Distribution," 2019 27th Euromicro International Conference on Parallel, Distributed and Network-Based Processing (PDP), Pavia, Italy, 2019, pp. 438-445, doi: 10.1109/EMPDP.2019.8671549. (Year: 2019), 8 pages.

M. Srivatsa, B. Gedik and Ling Liu, "Scaling Unstructured Peer-to-Peer Networks with Multi-Tier Capacity-Aware Overlay Topologies," Proceedings. Tenth International Conference on Parallel and Distributed Systems, 2004. ICPADS 2004., Newport Beach, CA, USA, 2004, pp. 17-24. (Year: 2004), 8 pages.

F. Turkmen, P. Mazzoleni, B. Crispo and E. Bertino, "P-CDN: Extending Access Control Capabilities of P2P Systems to Provide CDN Services," 2008 IEEE Symposium on Computers and Communications, Marrakech, Morocco, 2008, pp. 480-486, doi: 10.1109/ISCC.2008.4625671. (Year: 2008), 7 pages.

Patent Cooperation Treaty, International Search Report and Written Opinion issued for PCT Application No. PCT/IB2020/056777, dated Oct. 19, 2020, 15 pages.

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.

Jana et al. "Management of Security and Privacy Issues of Application Development in Mobile Cloud Environment: A Survey," IEEE International Conference on Recent Advances and Innovations in Engineering, May 2014, 6 pages.

Patent Cooperation Treaty, International Search Report and Written Opinion issued for PCT Application No. PCT/IB2020/056776, dated Feb. 22, 2021, 10 pages.

Post, H. et al., "Linking Functional Requirements and Software Verification," 2009 17th IEEE International Requirements Engineering Conference, 2009, 8 pages.

Patent Cooperation Treaty, International Search Report and Written Opinion issued for PCT Application No. PCT/IB2021/050134, dated Mar. 4, 2021, 14 pages.

JFrog; "Access Tokens," https://www.jfrog.com/confluence/display/JCR6X/Access+Tokens, Jan. 29, 2020 (Year: 2020), 1 page.

Alibaba Cloud; "Alibaba Dragonfly DCOS Case Study: China Mobile (Zhejiang Branch)," https://alibaba-cloud.medium.com/alibaba-dragonfly-dcos-case-study-china-mobile-zhejiang-branch-a13dc751a2c, Jan. 14, 2019 (Year: 2019), 14 pages.

eduonix.com; "Alibaba's DragonFly—A New P2P File Distribution Framework," https://blog.eduonix.com/software-development/alibabas-dragonfly-p2p-distribution/, Jul. 4, 2018 (Year: 2018), 3 pages.

Alibaba Cloud; "Behind Alibaba's Double 11 Mysterious "Dragonfly" Technology ® C PB-Grade Large-File Distribution System," https://www.alibabacloud.com/blog/behind-alibabas-double-11-mysterious-dragonfly-technology-®c-pb-grade-large-file-distribution-system_594074, Oct. 15, 2018 (Year: 2018), 14 pages.

Seneviratne, Aidk; "Enabling an Authentication Mechanism for Docker Remote API," Mar. 2017 (Year: 2017), 70 pages.

IEEE; "FID: A Faster Image Distribution System for Docker Platform," 2017 (Year: 2017), 8 pages.

DragonFly; "What Is DragonFly?" https://web.archive.org/web/20190501065255/https://d7y.io/enus/docs/overview/what_is_dragonfly.html, May 1, 2019 (Year: 2019), 3 pages.

Uber Engineering Blog; "Introducing Kraken, an Open Source Peer-to-Peer Docker Registry," https://eng.uber.com/introducing-kraken/, May 5, 2019 (Year: 2019), 3 pages.

JFrog; "Searching for Artifacts," https://www.jfrog.com/confluence/display/JCR6X/Searching+for+Artifacts, Jan. 29, 2020 (Year: 2020), 3 pages.

Yoshida et al. "Understanding the Origins of Weak Cryptographic Algorithms Used for Signing Android Apps," 2018 $42^{nd}$ IEEE International Conference on Computer Software and Applications; 6 pages.

* cited by examiner

DATA FILE PARTITION AND REPLICATION

CROSS-REFERENCE TO RELATED APPLICATIONS

The present application is a continuation of, and claims benefit of priority to, U.S. patent application Ser. No. 17/727,126 entitled "DATA FILE PARTITION AND REPLICATION," filed Apr. 22, 2022, which is a continuation of, and claims benefit of priority to, U.S. patent application Ser. No. 16/399,953 entitled "DATA FILE PARTITION AND REPLICATION," filed Apr. 30, 2019, now U.S. Pat. No. 11,340,894 issued May 24, 2022, and is related to U.S. patent application Ser. No. 16/399,905 entitled "DATA BUNDLE GENERATION AND DEPLOYMENT," filed Apr. 30, 2019; U.S. patent application Ser. No. 16/399,915 entitled "ACTIVE-ACTIVE ENVIRONMENT CONTROL," filed Apr. 30, 2019; and U.S. patent application Ser. No. 16/399,938 entitled "DATA FILE PARTITION AND REPLICATION," filed Apr. 30, 2019; the contents of each of which are incorporated by reference herein in their entirety.

TECHNICAL FIELD

The present application is generally related to the technical field of file replication, and more particularly, but not by way of limitation, to techniques for distributing a file and/or software and maintaining data consistency in between servers of a file (e.g., artifact) repository system.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Additionally, software can be updated to add or remove functionality, to correct bugs (e.g., critical/functional issues), and/or to address security issues. Developing and updating software can occur at multiple locations around the globe, with each location needing access to the same files/software. When an organization has development teams across the world, external and internal dependencies of files and/or software can be maintained locally at different locations to promote development productivity. However, synchronizing files between multiple locations can be time consuming depending on a file size, a network topology, and/or a development methodology. Additionally, maintaining availability between files and/or software at multiple locations can be hindered by network latency and bandwidth limitations.

Additionally, to deploy and/or update a piece of software, a new version is developed and deployed to a device, such as a software consumable device that stores and executes the new version of the software. To deploy a new version of software, a memory device including the new version of the software can be physically connected and uploaded to a target device. Deploying software in such a manner can be time consuming, resource (e.g., personnel) intensive, and is impractical for software to be deployed to multiple locations or for service-oriented architecture that may require multiple updates for different pieces of software at different times. Alternatively, the new version of the software can be deployed via one or more networks. However, deployment of software via a network presents its own challenges. For example, a device to receive the software needs to be connected to the network and maintain a sufficient network connection to receive the entire version of the software. As another example, the network itself must have sufficient bandwidth and acceptable latencies to enable the software to be deployed. Additionally, software needs to be deployed in a secure manner so that unauthorized updates and/or deployments are avoided. Thus, developing and deploying software efficiently, consistently, and securely poses many difficult challenges.

BRIEF SUMMARY

Embodiments of the present disclosure provide systems, methods, and computer-readable storage media that provide for replicating a file, such as to distribute a file during a software release and/or to maintain data availability between servers of a file (e.g., artifact) repository system. For example, a source device (e.g., a server having an application) may identify one or more files for replication to a target device, such as a node device or another server of an artifact repository system. To illustrate, the source device may identify a first version of a file available to the source device is to be replicated at the target device—e.g., replicated as part of a push operation or a pull operation. In some implementations, the file may be included in software deployment as one of multiple files. The source device is configured to initiate a replication process in which source replication information of the first version of the file is determined. Additionally, the source device obtains target replication information corresponding to a second version of the file available to the target device. In some implementations, a request for target replication information may be sent to the target device to request identification of and/or target replication information corresponding to the second version of the file available to the target device. If the second version of the file matches the first version of the file, no additional actions are needed. Alternatively, if the second version of the file available to the target device is different from the first version of the file available to the source device, the replication process determines a difference between the different versions of the file. The source device then sends one or more portions of the first version of the file and the source replication information to the target device. Based on the second version of the file at the target device, the one or more portions, and the source replication information, the target device may assemble and store a file that corresponds to the first version of the file.

Thus, the systems, methods, and computer-readable storage media described herein utilize a replication process to efficiently, consistently, and securely communicate one or more files. Because only files (e.g., artifacts) that are not already stored at a target device (or a device coupled to the target device) are transmitted between devices (e.g., via a network), network bandwidth usage as compared to transmitting an entirety of a software release is reduced, which may enable distribution in situations with limited network bandwidth or other network issues. Additionally, because portions to be updated for a file are identified and transmitted, a reduced amount of data can be sent as compared to sending an entirety of the updated file, which can reduce or compensate for an impact of a bandwidth limitation and/or latency of a network.

According to one embodiment, a method for replicating one or more files across a multi-node network is described. The method includes identifying first replication information comprising a first plurality of checksums corresponding to a first version of a file utilized by a first node in the multi-node network, and identifying second replication information comprising a second plurality of checksums corresponding to a second version of the file utilized by a second node in the multi-node network. The method also includes calculating a difference between the first version of the file and the second version of the file and, based on the calculated difference, identifying update data that is included in the first version of the file and not included in the second version of the file. The method further includes transmitting, to the second node, the update data.

According to yet another embodiment, a system for replicating one or more files at a target node is described. The system includes at least one memory storing instructions and one or more processors coupled to the at least one memory. The one or more processors are configured to execute the instructions to cause the one or more processors to identify first replication information comprising a first plurality of checksums corresponding to a first version of a file utilized by a source node, and identify second replication information comprising a second plurality of checksums corresponding to a second version of the file utilized by a target node. The one or more processors are further configured to execute the instructions to cause the one or more processors to calculate a difference between the first version of the file and the second version of the file and, based on the calculated difference, identify update data that is included in the first version of the file and not included in the second version of the file. The one or more processors are also configured to execute the instructions to cause the one or more processors to transmit, to the target node, the update data.

According to another embodiment, a computer program product is described that includes a computer-readable storage device, such as a non-transitory computer-readable storage medium, that includes instructions that, when executed by one or more processors, cause the one or more processors to perform operations for replicating one or more files at a target node. The operations include executing a first routine to identify first replication information comprising a first plurality of checksums corresponding to a first version of a file utilized by a first node. The operations further include executing a second routine to identify second replication information comprising a second plurality of checksums corresponding to a second version of the file utilized by a second node. The operations also include executing a third routine to calculate a difference between the first version of the file and the second version of the file, executing a fourth routine to, based on the calculated difference, identify update data that is included in the first version of the file and not included in the second version of the file, and executing a fifth routine to transmit, to the second node, the update data.

According to another embodiment, a method for replicating one or more files across a multi-node network is described. The method includes receiving, from a source node having source replication information corresponding to a first version of a file, a request at a target node for target replication information corresponding to a second version of the file. The source replication information comprises a first plurality of checksums corresponding to the first version of the file utilized by the source node. The target replication information comprises a second plurality of checksums corresponding to the second version of the file utilized by the target node. The method further includes sending, from the target node to the source node, the target replication information. The method also includes receiving, at the target node from the source node, the source replication information, and receiving, at the target node from the source node, update data corresponding to a difference between the first version of the file and the second version of the file. The method includes combining, at the target node and based on the source replication information, the update data and a portion of the second version of the file that is the same between the first version of the file and the second version of the file to generate a third version of the file. In some such implementations, the third version of the file is identical to the first version of the file.

According to yet another embodiment, a system for replicating one or more files at a target node is described. The system includes at least one memory storing instructions and one or more processors coupled to the at least one memory. The one or more processors are configured to execute the instructions to cause the one or more processors to receive, from a source node having source replication information corresponding to a first version of a file, a request for target replication information corresponding to a second version of the file. The source replication information comprises a first plurality of checksums corresponding to the first version of the file utilized by the source node. The target replication information comprises a second plurality of checksums corresponding to the second version of the file utilized by the target node. The one or more processors are further configured to execute the instructions to cause the one or more processors to send the target replication information to the source node, receive the source replication information from the source node, and receive update data corresponding to a difference between the first version of the file and the second version of the file from the source node. The one or more processors are also configured to execute the instructions to cause the one or more processors to combine, based on the source replication information, the update data and a portion of the second version of the file that is the same between the first version of the file and the second version of the file to generate a third version of the file. In some such implementations, the third version of the file is identical to the first version of the file.

According to another embodiment, a computer program product is described that includes a computer-readable storage device, such as a non-transitory computer-readable storage medium, that includes instructions that, when executed by one or more processors, cause the one or more processors to perform operations for replicating one or more files at a target node. The operations include executing a first routine to receive, from a source node having source replication information corresponding to a first version of a file, a request for target replication information corresponding to a second version of the file. The source replication information comprises a first plurality of checksums corresponding to the first version of the file utilized by the source node. The target replication information comprises a second plurality of checksums corresponding to the second version of the file utilized by the target node. The operations further include executing a second routine to send the target replication information to the source node. The operations also include executing a third routine to receive the source replication information from the source node, executing a fourth routine to receive update data corresponding to a difference between the first version of the file and the second version of the file from the source node, and executing a fifth routine to combine, based on the source replication information, the update data and a portion of the second version of the file that is the same between the first version of the file and the second version of the file. To illustrate, the update data and the portion of the second version of the file (that is the same between the first version of the file and the second version of the file) may be combined to generate a third version of the file. In some such implementations, the third version of the file is identical to the first version of the file.

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION OF THE INVENTION

Figure 1:
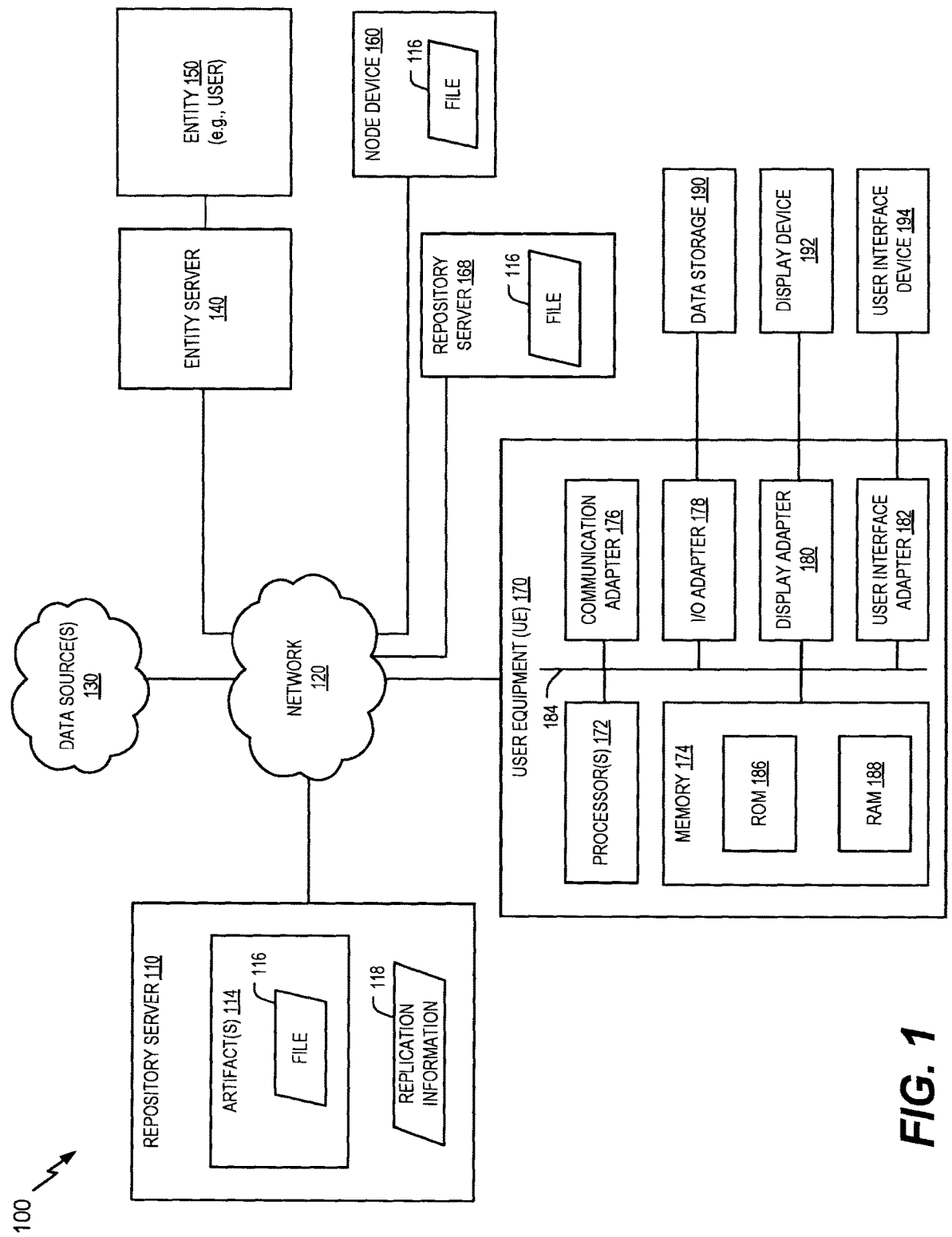
FIG. 1 is a block diagram of an example of a system that includes a server for replication of software.

Inventive concepts utilize a system to replicate a file. To illustrate, a first version of a file may be identified to be replicated at a target device. For example, the first version of the file may be replicated to maintain availability of the first version of the file at multiple locations corresponding to one or more development teams. As another example, the first version of the file may correspond to a build job for software (e.g., services, infrastructure, or a combination thereof) to be deployed to and/or updated at the target device. In some implementations, the first version of the file to be replicated may be identified based on a push operation initiated at or by the source device. In other implementations, the first version of the file to be replicated may be identified based on a pull operation initiated at or by the target device.

Based on the first version of the file to be replicated, a source device may identify source replication information for the first version of the file and target replication information for a second version of the file available to (e.g., at) the target device. The source replication information includes a first set of one or more checksums corresponding to the first version of the file and the target replication information includes a second set of one or more checksums corresponding to the second version of the file. In some implementations, the source device receives the target replication information of the second version from the target device. In other implementations, the source device receives an indication of the second version from the target device or maintains a record of at least one version of the file available to the target device and, using this information, generates the target replication information.

Embodiments also provide that a comparison is performed between the source replication information and the target replication information to calculate a difference between the first version of the file and the second version of the file. For example, calculating the difference comprises identifying at least one checksum of the source replication information that is not included in the second set of one or more checksums included in the target replication information. The at least one checksum corresponds to update data to be provided to the target device to enable the target device to replicate the first version of the file. For each of the at least one checksum, a corresponding portion of the first version of the file is identified and sent to the target device. Additionally, the source device may also send the source replication information to the target device.

In some embodiments, after identifying the update data, the source device may partition the update data into multiple portions (e.g., multiple data packets for transmission) and send each portion to the target device. For example, the source device may partition the update data based on a size threshold. Each portion of the multiple portions may include one or more checksums corresponding to the portion, a size/position indicator (e.g., a data position start indicator and a data position end indicator) corresponding to the portion, or both. The multiple portions may be sent to the target device, sequentially or concurrently. To illustrate, the source device may send a first portion to the target device and await to receive a first acknowledgment from the target device responsive to the first portion. Based on receiving the first acknowledgement, the source device may concurrently send a second portion and a third portion to the target device. In the event that the source device does not receive an acknowledgement responsive to sending a particular portion, the source device can resend the particular portion.

Embodiments herein also provide the target device receiving the update data and assembling the update data based on the source replication information. To illustrate, the target device may determine an entirety of the update data is received. Additionally, the target device may identify one or more portions of the second version of the file that are the same between the first version of the file and the second version of the file. The target device may assemble the update data and the one or more portions of the second version of the file (that are the same between the first version of the file and the second version of the file) based on an order of the first plurality of checksums of the source replication information, based on the size/position indicator, or a combination thereof.

In some embodiments, the target device may verify the assembled file matches the first version of the file. For example, the target device may identify a checksum corresponding to an entirety of the first version of the file. In some implementations, the checksum corresponding to an entirety of the first version of the file may be included in the source replication information. Additionally, the target device may generate a checksum for an entirety of the assembled file and compare the checksum for the entirety of the assembled file with the checksum for the entirety of the first version of the file to determine whether the assembled file matches the first version of the file. In response to a determination that the assembled file does not matches the first version of the file, the assembled file may be discarded. Alternatively, in response to a determination that the assembled file matches the first version of the file, the assembled file may be stored at the target device as the first version of the file.

In some embodiments, the source device may initiate concurrent replication of multiple files in parallel. For example, a software release may include multiple files to be distributed to a target device. At least two files of the multiple files may be identified as needing to be replicated at the target device. The source device may initiate a first replication transaction corresponding to a first file and a second replication transaction corresponding to the second file. The first and second replication transactions may be performed concurrently (e.g., in parallel).

The foregoing features provide a system for efficient, consistent, and secure replication of one or more files (available to a source device) at the target device. This can be advantageous in a number of scenarios. For example, the target device can provide an indication of a version of a file available to the target device to enable the source device to determine a difference between a version of the file available to the target and a version of the file (at the source device) to be replicated at the target device. In some implementations, the indication can include target replication information that includes one or more checksums corresponding to the version of the file available to the target device thereby enabling the source device to easily perform a checksum comparison between the target replication information and source replication information that includes one or more checksums corresponding to the version of the file available to the source device. Based on a difference between the checksums, the source device can identify one or more portions of the file (to be replicated at the target device) to be sent to the target device—i.e., the source device does not have to send an entirety of the version of the file to be replicated to the target device. Because only files (e.g., artifacts) that are not already stored at target device (or a device coupled to target device) are transmitted between devices (e.g., via a network), network bandwidth usage as compared to transmitting an entirety of a software release is reduced, which may enable distribution in situations with limited network bandwidth or other network issues. To enable the target device to replicate the intended version of the file, the source device provides the source replication information to the target device. Based on the source replication information, the target device can advantageously assemble and verify the version of the file to be replicated at the target device. Thus, the systems, methods, and computer-readable storage media described herein utilize a replication process to efficiently, consistently, and securely replicate one or more files at a target device.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for replicating a file is shown and designated as system 100. Replicating a the file may be performed as part of distribution of the file, such as during a software release, and/or as part of maintaining data consistency between servers of a file (e.g., artifact) repository system, as illustrative, non-limiting examples. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to one implementation, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2 and 3. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of server 110 to access and modify aspects (e.g., instructions, applications, data) of server 110. For example, components comprising user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of server 110, entity server 140, entity 150, node device 160, and/or server 168.

As shown, server 110 includes one or more artifacts 114 and replication information 118. Artifacts may include one or more binaries (e.g., a computer file that is not a text file). For example, the one or more artifacts 114 may include a file, such as a representative file 116. The artifacts may correspond to one or more package types. For example, a first artifact may correspond to a first package type, such as Maven, and a second artifact may correspond to a second package type, such as Bower. Replication information 118 may include, for a particular file, a checksum for each of one or more portions of the particular file, a size of each portion of the one or more portions, a check sum for an entirety of the particular file; a size of the entirety of the particular file, or a combination thereof.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

In some implementations, entity 150 is configured to add, modify, and/or access one or more artifacts (e.g., 114) at server 110. In some implementations, entity 150 is configured to generate (or initiate generation of) a release list of one or more files (e.g., artifacts) to be included in a software release (e.g., a software deployment). For example, a release list may correspond to a build job. In some implementation, entity 150 provides the release list to server 110 to cause server 110 to initiate a software release. In other implementations, entity 150 provides a query and/or one or more parameters for a query which is performed by server 110 to generate the release list at server 110. To illustrate, entity 150 initiate a query by server 110 to identify one or more files corresponding to a particular build job identifier. Additionally, entity 150 may identify one or more node devices (e.g., 160) to receive the software deployment.

Node device 160 includes one or more files, such as file 116. In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system.

With respect to user equipment 170, user equipment may include one or more processors 172, memory 174, a communication adapter 176, an input/output (I/O) adapter 178, a display adapter 180, a user interface adapter 182, and a bus 184. As shown, each of one or more processors 172, such as a central processing unit (CPU), memory 174, communication adapter 176, I/O adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more data storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can comprise a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 (and/or server 168) using a device via one or more networks, such as network 120, which itself can comprise one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
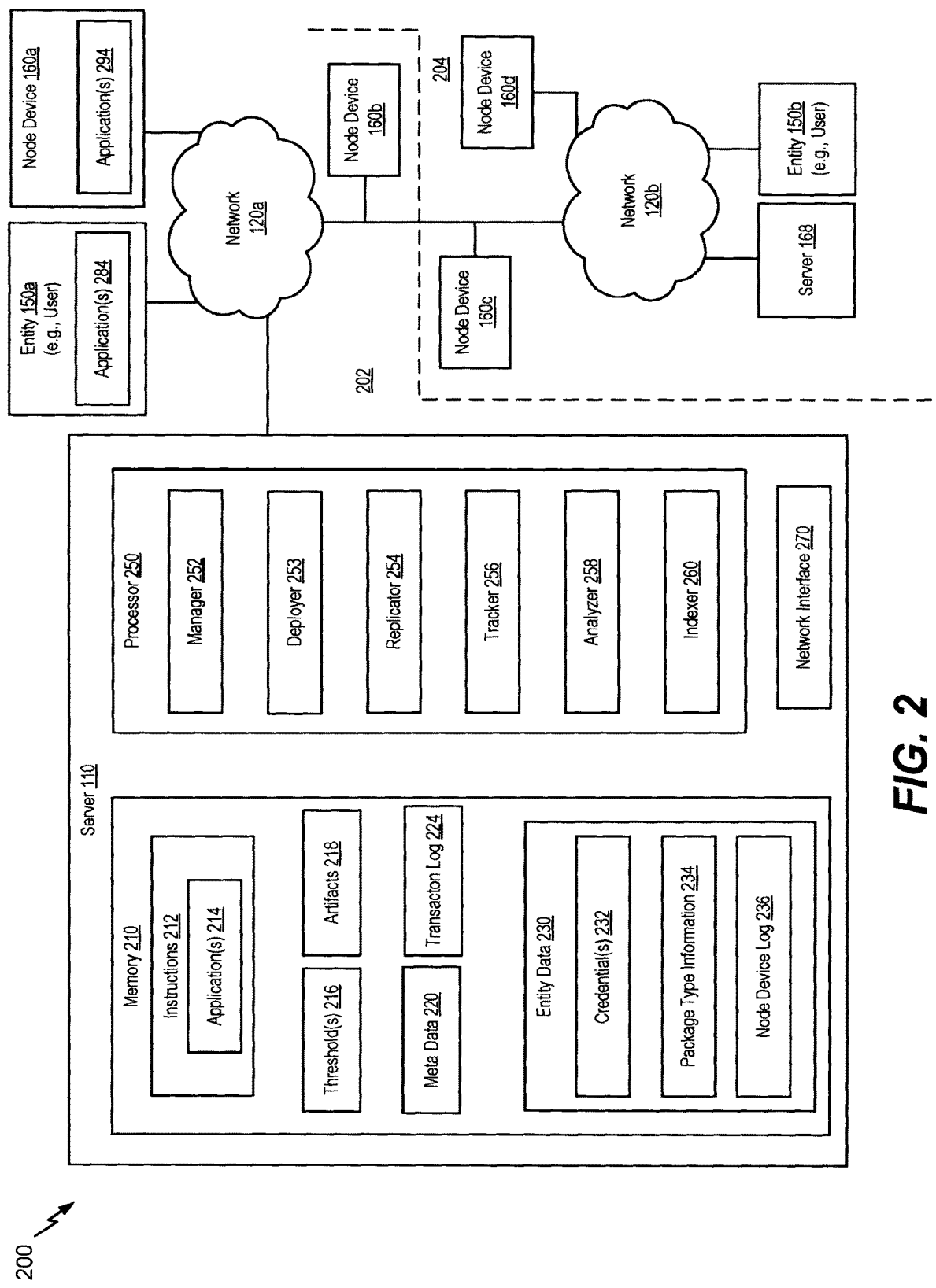
FIG. 2 is a block diagram of another example of a system for replication of software.

Referring to FIG. 2, a block diagram of a system for replicating a file according to an embodiment is shown as a system 200. System 200 may include or correspond to at least a portion of system 100. System 200 includes server 110, networks 120a, 120b, entities 150a, 150b, node devices 160a, 160b, 160c, 160d, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 168 is included in second region 204. Server 168 may be a repository server and may include or correspond to server 110. In some implementations, server 110 and server 168 may be included in a universal artifact management system. Networks 120a, 120b may include or correspond to network 120. Each of the entities 150a, 150b may include or correspond to entity 150. In some implementations, a first entity 150a and a second entity 150b may be part of the same group, company, etc., or may be part of different groups, companies, etc. Each of node devices 160a, 160b, 160c, 160d may include or correspond to node device 160. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more of entities (e.g., 150a, 150b), one or more node devices (e.g., 160a, 160b, 160c, 160d), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, artifacts 218 (e.g., binaries), meta data 220, a transaction log 224, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by processor 250. In some such implementations, one or more of the memories may be external to server 110. To illustrate, at least one memory may include or correspond to a database accessible to server 110, such as a database that stores one or more thresholds 216, artifacts 218, meta data 220, transaction log 224, entity data 230, or any combination thereof. In some implementations, memory 210 may include or be coupled to cloud storage such that one or more thresholds 216, one or more of artifacts 218, meta data 220, transaction log 224, entity data 230 is stored at a cloud storage location and accessible by server 110.

Threshold(s) 216 may include or correspond to one or more thresholds, such as a file size threshold, a time period threshold, a number of transmission attempts threshold, etc. Artifacts 218 may include or correspond to artifacts 114. Meta data 220 may include meta data for artifacts 114, meta data for application 214, meta data for one or more files (e.g., 116), replication information (e.g., 118), or any combination thereof. Meta data for an artifact (e.g., a file 116) may include a file name, a file size, a checksum of the file, and/or one or more properties that annotate the artifact, such as when the artifact was created by a build, a build job name, an identifier of who initiate the build, a time the build was initiated, a build agent, a CI server, a build job number, a quality assurance test passed indicator, as illustrative, non-limiting examples.

Transaction log 224 may track one or more transactions such as storage, modification, and/or deletion of an artifact (e.g., 218), meta data (e.g., 220), file (e.g., 116), permissions, or any combination thereof. In some implementations, transaction log 224 may be utilized to maintain data consistency between servers in different regions, such as server 110 and server 168. To illustrate, in implementations where each server 110, 168 is to have the same set of one or more artifacts (e.g., 218) and/or meta data (e.g., 220), the transaction log 224 provides an indication of what data (e.g., artifacts and/or meta data) needs to be up added, updated, and/or removed between the servers 110, 168. Additionally, or alternatively, transaction log 224 may indicate which version of a file has been provided to and/or is stored at a particular device, such as server 110, a node (e.g., 160a, 160b, 160c, 160d), and/or server 168. In some implementations, transaction log 224 may indicate replication information stored at, or corresponding to a file stored at, a particular device, such as server 110, a node (e.g., 160a, 160b, 160c, 160d), and/or server 168.

Entity data 230 may include data associated with one or more entities. For example, entity data 230 may include or correspond to one or more of entity 150*a*, 150*b*. Entity data 230 may include one or more credentials 232, package type information 234, and a node device log 236. Credential 232 include login information to enable one or more users and/or one or more entities to access server 110. Additionally, or alternatively, credential 232 may include security or authentication information, such as a private key and/or public key of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate replication information stored at, or corresponding to a file stored at, a particular device, such a node (e.g., 160*a*, 160*b*, 160*c*, 160*d*).

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150*a*) to manage one or more other components/modules (e.g., 253, 254, 256, 258, 260) of processor 250. Additionally, or alternatively, manager 252 may enable storage of and/or access to one or artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150*a*) to monitor and control a first instance of a user account (corresponding to first region 202) and a second instance of the user account (corresponding to second region 204). For example, the entity (e.g., 150*a*) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., the processor 172 of FIG. 1) or processor 250 to enable a user (e.g., 150*a*) to manage one or more other components/modules (e.g., 253, 254, 256, 258, 260) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. A release bundle may include one or more files and/or release bundle information which includes or indicates a list of the one or more files (e.g., artifacts) to be included in the release bundle and meta data (e.g., properties) associated with the release bundle. The release bundle information may include, for each file of the bundle release, a checksum (of the file), meta data (corresponding to the file), or both. In some implementations, the release bundle also includes additional meta data (e.g., file name, file size, path to the file, etc.) corresponding to the release bundle, such as a release bundle name, a version number, a source identifier, description information, release date, a size. Additionally, or alternatively, the release bundle information may include a signature (or other cryptography technique) to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more nodes devices (e.g., 160*a*, 160*b*, 160*c*, 160*d*). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution as described herein.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 168, between server 110 and one or more of node devices 160*a*, 160*b*, 160*c*, 160*d*, or both. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 168 or a node device), and initiate transfer of at least one or more portions of a file to the second device, as described further herein. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more artifacts, meta data, one or more release bundles, or any combination thereof deployed or attempted to be deployed to a node device, such as one or more of node devices 160a, 160b, 160c, 160d, a server (e.g., 110, 168), or both. In some implementations, tracker 256 includes a tracker module that includes one or more routines, executable by one or more processors (e.g., the processor 172 of FIG. 1) or processor 250 to track one or more artifacts, meta data, one or more release bundles, or any combination thereof deployed or attempted to be deployed to a node device, such as one or more of node devices 160a, 160b, 160c, 160d and/or one or more servers.

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Figure 3:
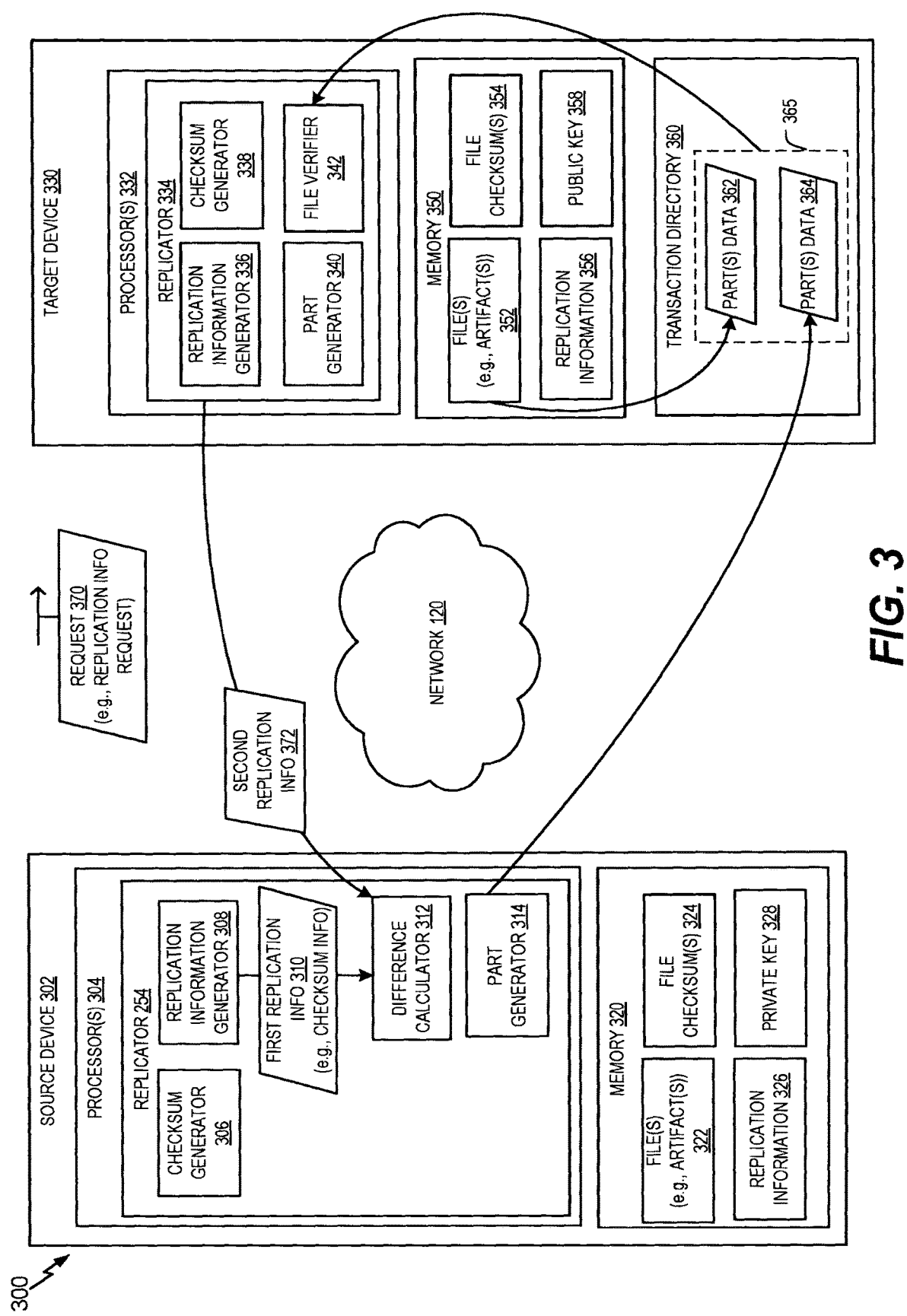
FIG. 3 is a block diagram of another example of a system for replication of software.

Referring to FIG. 3, a block diagram of a system for replicating a file is shown and designated as system 300. System 300 may include or correspond to at least a portion of system 100 and/or system 200. System 300 includes a source device 302 and a target device 330. Source device 302 and target device 330 may be coupled via one or more networks, such as network 120. Source device 302 may include or correspond to server 110. Target device 330 may include or correspond to server 168, an intermediate server (e.g., a client server), node device 160, 160a, 160b, 160c, 160d, or a combination thereof.

Source device 302 includes one or more processors 304 and a memory 320. Processor 304 may include or correspond to processor 250, and memory 320 may include or correspond to memory 210. As shown, processor 304 includes replicator 254. Replicator 254 includes a checksum generator 306, a replication information generator 308, a difference calculator 312, and a part generator 314. Although replicator 254 is described as including checksum generator 306, replication information generator 308, difference calculator 312, and part generator 314, in other implementations, one or more of checksum generator 306, replication information generator 308, difference calculator 312, and part generator 314 may be distinct from replicator 254. For example, checksum generator 306 and/or replication information generator 308 may include or correspond to indexer 260.

Checksum generator 306 is configured to generate a checksum based on one or more files, one or more portions of a file, an entirety of a file, meta data corresponding to at least one file, or any combination thereof. In some implementations, when a file includes a zip file having multiple header portions and multiple data portions, the checksum generator may generate a checksum for each header portion, each data portion, and an entirety of the zip file. Additionally, or alternatively, checksum generator 306 may be configured to generate a checksum according to a Sha-256 algorithm, as an illustrative, non-limiting example. An example of checksums for a file is described with reference to FIG. 4. In some implementations, checksum generator 306 includes a checksum generator module that includes one or more routines, executable by one or more processors (e.g., the processor 172 of FIG. 1 or processor 250 of FIG. 2) or processor 304 to generate one or more checksums as described herein.

Replication information generator 308 is configured to generate replication information (e.g., checksum information), such as replication information 118 and/or first replication information 310, as illustrative, non-limiting examples. For example, for a particular file, replication information generator 308 may generate replication information that includes a checksum for each of one or more portions of the particular file, a size of each portion of the one or more portions, a checksum for an entirety of the particular file, a size of the entirety of the particular file, or a combination thereof. In some implementations, replication information generator 308 includes a replication information generator module that includes one or more routines, executable by one or more processors (e.g., the processor 172 of FIG. 1 or processor 250 of FIG. 2) or processor 304 to generate replication information as described herein.

Difference calculator 312 is configured to determine a difference between two different versions of a file. For example, difference calculator 312 may determine a difference between a first version of a file and a second version of the file based on a comparison of first replication information corresponding to the first version of the file and second replication information corresponding to the second version of the file. To illustrate, difference calculator 312 may determine the difference as one or more checksums included in the first replication information but not included in the second replication information. Alternatively, difference calculator 312 may determine the difference as one or more checksums included in the second replication information but not included in the first replication information. It is also noted that in some implementations, difference calculator 312 may also be configured determine one or more portions of the first version of the file and the second version of the file that match based on a checksum of the first replication information matching a checksum of the second replication information. Additionally, in some implementations, difference calculator 312 may verify different checksums or matching checksums based on size indicators corresponding different checksums. In some implementations, difference calculator 312 includes a difference calculator module that includes one or more routines, executable by one or more processors (e.g., the processor 172 of FIG. 1 or processor 250 of FIG. 2) or processor 304 to calculate a difference between two different versions of a file as described herein.

Part generator 314 is configured to identify one or more portions of a file. For example, part generator 314 may identify the one or more portions based on a result (e.g., one or more different checksums of a file and/or one or more matching checksums) output by difference calculator 312. Additionally, or alternatively, part generator 314 may be configured to divide and/or combine one or more portions of a file into transmission packets to be sent to another device, such as target device 330. In some implementations, part generator 314 includes a part generator module that includes one or more routines, executable by one or more processors (e.g., the processor 172 of FIG. 1 or processor 250 of FIG. 2) or processor 304 to identify one or more portions of a file and/or packetize one or more portions of a file as described herein.

Memory 320 includes one or more files 322 (e.g., artifacts), one or more file checksums 324, replication information 326, and a private key 328 that corresponds to a public key 358 that is provided to one or more target devices (e.g., 330). The one or more files 322 may include or correspond to file 116 and/or the one or more artifacts 218. File checksums 324 may include one or more checksums for a file (e.g., 116, 218, 322), such as a checksum for at least one portion of the file, a checksum for an entirety of the file, or both. For example, file checksums 324 may include or correspond to meta data 220. Replication information 326 may include, for each of one or more versions of a file, corresponding replication information (e.g., 118). In some implementations, memory 320 may include additional data and/or information, such as described at least with reference to memory 210. Additionally, memory 320 may include instructions (not shown) that are executable by processor 304 to cause processor 304 to perform one or more operations. In some implementations, the instructions may include or be arranged as an application, such as application 214 (e.g., a software program), associated with source device 302. Although system 300 is described as including one source device 302, in other implementations, system 300 may include multiple source devices (e.g., 302) coupled to target device 330.

Target device 330 includes one or more processors 332, a memory 350 (e.g., one or more memories), and a transaction directory 360. Transaction directory 360 may include or correspond to a storage device configured to receive and store one or more files. In some implementations, transaction directory 360 is distinct from memory 350. In other implementations, transaction directory 360 includes a logical or virtual portion of memory 350.

Memory 350 includes one or more files 352 (e.g., one or more artifacts), one or more file checksums 354, replication information 356, and public key 368. The one or more files 352 may include or correspond to file 116, the one or more artifacts 218, and/or the one or more files 322. For example, the one or more files 352 may include a different version of a file that is included in the one or more files 322. To illustrate, the one or more files 322 may include a first version of a file and the one or more files 352 may include a second version of the file. In a particular implementation the second version of the file is an older version of the file as compared to the first version of the file. The one or more file checksums 354 may include checksums and/or other information, as described with reference to the one or more file checksums 324. The replication information 356 may include replication information, as described with reference to replication information 326. Public key 358 may correspond to private key 328. Additionally, memory 350 may include instructions (not shown) that are executable by processor 332 to cause processor 332 to perform one or more operations. In some implementations, the instructions may include or be arranged as an application, such as application 294 (e.g., a software program).

Processor 332 includes a replicator 334, which may be similar to replicator 254 included in processor 304. Replicator 334 includes a replication information generator 336, a checksum generator 338, and a part generator 340. Replication information generator 336, checksum generator 338, and part generator 340 may be similar to replication information generator 308, checksum generator 306, and part generator 314, respectively. Additionally, or alternatively, replicator 334 may include a difference calculator (not shown) which may be similar to difference calculator 312. Replicator 334 also includes a file verifier 342. File verifier 342 is configured to verify whether two files (e.g., two different versions of a file) match or do not match. For example, file verifier 342 may determine whether two different versions of a file match (e.g., a first version and a second version) based on first replication information for the first version (e.g., one or more checksums for different portions of the first version, one or more size indicators for different portions of the first version, a checksum for an entirety of the first version, and/or a size indicator for an entirety of the first version) and based on second replication information for the second version (e.g., one or more checksums for different portions of the second version, one or more size indicators for different portions of the second version, a checksum for an entirety of the second version, and/or a size indicator for an entirety of the second version). In some implementations, file verifier 342 includes a file verifier module that includes one or more routines, executable by one or more processors (e.g., the processor 172 of FIG. 1) or processor 332 to verify whether two files (e.g., two different versions of a file) match or do not match.

Although system 300 is described as including one target device 330, in other implementations, system 300 may include multiple target devices (e.g., 330) coupled to source device 302. Additionally, or alternatively, it is noted that target device 330 (e.g., processor 332) may include one or more additional components or modules, such as manager 252 and/or deployer 253, as illustrative, non-limiting examples.

During operation of system 300, source device 302 receives a request to replicate a first version of a file (e.g., file 322) to target device 330. In response to receiving the request, source device, identifies the first version of the file and determines a size of the first version of the file and/or a file type of the first version of the file. If a size of the first version of the file is less than or equal to a threshold size, such as 4 Mb, source device 302 sends an entirety of the first version of the file to the target device 330. For example, the source device 302 may send the entirety of the first version of the file rather than initiating a replication transaction because an overhead cost (e.g., time, computational resources, etc.) of performing the replication transaction are greater than sending the entirety of the first version of the file. Additionally, or alternatively, if the file type (e.g., a package type) of the first version of the file is not supported by replicator 254, source device 302 may send the first version of the file to the target device 330 without initiating a replication transaction. In some such implementations, if the file type is not supportable for a replicator transaction but is greater than the threshold size, source device 302 may partition the first version of the file into multiple portions to be sent to target device 330.

If the first version of the file has a size that is greater than the threshold size and/or is supported by replicator 254, source device 302 requests first replication information 310 from replicator 254 and requests second replication information (e.g., second replication information 372) from replicator 254. In some implementations, replicator 254 generates first replication information 310. In other implementations, first replication information 310 is stored at replication information 326 and replicator 254 requests first replication information 310 from memory 320. Regarding second replication information 372, replicator 254 may send a request 370 to target device 330. In some implementations, request 370 may identify the file (e.g., file name) of the first version of the file.

Responsive to request 370, replicator 334 may identify a "closest" version of the file, such as a highest version number of the file, available/present at target device 330. To illustrate, replicator 334 may identify the second version of the file. In some implementations, replicator 334 generates second replication information 372. In other implementations, second replication information 372 is stored at replication information 356 and replicator 334 requests second replication information 372 from memory 350. Target device 330 (e.g., replicator 334) may send second replication information 372 to source device 302.

Responsive to obtaining first replication information 310 and second replication information 372 at replicator 254, source device 302 (e.g., difference calculator 312) may determine a difference (e.g., a comparison result) between the first version of the file and the second version of the file based on the first and second replication information. The difference may indicate which portions of the first version of the file are to be provided to target device 330 to enable target device 330 to replicate the first version of the file at target device 330. To illustrate, the difference may indicate one or more checksums that are included in first replication information 310 and are not included in second replication information 372.

Based on the difference, replicator 254 (e.g., part generator 314) may identify one or more portions of the first version of the file as update data. Replicator 254 (e.g., part generator 314) may send the update data to target device 330 as one or more parts of update data 364. In some implementations, the update data is sent to target device 330 as a single transmission packet. In other implementations, part generator 314 may partition the update data into multiple parts that are sent to target device 330. When the update data is sent as multiple parts (e.g., multiple transmission packets), a first transmission packet may include update data corresponding to a first checksum of the first version of the file and corresponding to a second checksum of the first version of the file. In addition to sending the one or more parts of update data 364, replicator 254 may send first replication information 310 target device 330 so that target device 330 can assemble the first version of the file at target device 330.

To assemble the first version of the file at target device 330, target device 330 may compare first replication information 310 to second replication information 372 to determine which checksums of first replication information 310 are and/or are not included in second replication information 372. For each checksum that is not included in second replication information 372, target device 330 may confirm that target device 330 has received a corresponding portion(s) of the first version of the file as the one or more parts of update data 364 in transaction directory 360. Additionally, or alternatively, for each checksum that is included in second replication information 372, target device 330 may provide one or more parts of data 362 corresponding to the checksums from memory 350 to transaction directory 360. Target device 330 may assemble the one or more parts of update data 364 and the one or more parts of data 362 according to first replication information 310, such that the assembly is based on an order of the checksums of first replication information 310.

After assembling the one or more parts of data 362, parts of update data 364 based on first replication information 310 to generate an assembled file 365, target device 330 may verify that assembled file 365 matches the first version of the file. For example, target device 330 may identify a checksum corresponding to an entirety of the first version of the file. In some implementations, the checksum corresponding to the entirety of the first version of the file may be included in first replication information 310. Additionally, target device 330 may generate a checksum for an entirety of assembled file 365 and compare the checksum for the entirety of assembled file 365 with the checksum for the entirety of the first version of the file to determine whether assembled file 365 matches the first version of the file. In response to a determination that assembled file 365 does not match the first version of the file, assembled file 365 may be discarded. In some such implementations, target device 330 may send a notification to source device 302 to indicate replication of the first version of the file was unsuccessful. Alternatively, in response to a determination that assembled file 365 matches the first version of the file, assembled file 365 may be stored at target device 330 (e.g., at memory 350) as the first version of the file.

In some implementations, source device 302 may include analyzer 258. Analyzer 258 may be configured to analyze one or more files for replication. In some implementations, in response to request to replicate one or more files, analyzer 258 may receive each of the one or more files and, for each file, determine whether a vulnerability exists corresponding to the file—e.g., whether one or more usage rules (e.g., a license rule) are violated, etc. If an issue is identified, analyzer 258 may initiate a notification and/or prohibit further processing/use of the file. Additionally, or alternatively, analyzer 258 may review the one or more files after replication of the one or more files. For example, source device 302 may perform one or more operations to replicate a file at target device 330. After replication of the file, analyzer 258 may analyze the file to determine if a vulnerability exists. To illustrate, analyzer 258 may review the stored file periodically, based on identification of new vulnerability, based on identification of expiration of a license, or any combination thereof, as illustrative, non-limiting examples. In the event that a vulnerability is detected, analyzer 258 may notify source device 302, target device 330, and/or another device or entity, such as entity 150.

In some implementations, source device 302 may generate and/or update transaction log 224 and/or node device log 236. Accordingly, transaction log 224 and/or node device log 236 may indicate which files are at which device—e.g., source device 302 and/or target device 330. In some implementations, transaction log 224 and/or node device log 236 may include or indicate which replication data, files, and/or which version of one or more files are stored at source device 302 and/or target device 330.

According to yet another embodiment, a system (e.g., 300) for replicating one or more files at a target node (e.g., 330) is described. The system includes at least one memory (e.g., 320) storing instructions and one or more processors (e.g., 304) coupled to the at least one memory. The one or more processors are configured to execute the instructions to cause the one or more processors to identify first replication information (e.g., 310) comprising a first plurality of checksums (e.g., 324) corresponding to a first version of a file (e.g., 322) utilized by a source node (e.g., 302), and identify second replication information (e.g., 372) comprising a second plurality of checksums (e.g., 354) corresponding to a second version of the file (e.g., 352) utilized by a target node (e.g., 330). The one or more processors are further configured to execute the instructions to cause the one or more processors to calculate a difference between the first version of the file and the second version of the file and, based on the calculated difference, identify update data (e.g., parts of update data 364) that is included in the first version of the file and not included in the second version of the file. The one or more processors are also configured to execute the instructions to cause the one or more processors to transmit, to the target node, the update data. In some such implementations, the source node and the target node use a shared naming convention.

In some implementations, the one or more processors are also configured to execute the instructions to cause the processor to receive an upload of the first version of the file at the source node and, responsive to the upload of the first version of the file, generate the update data. In some such implementations, the one or more processors are also configured to execute the instructions to cause the processor to receive, at the source node, a request to replicate the first version of the file at the target node, determine a size of the first version of the file, and perform a comparison between the size and a threshold. If the size of the file is greater than or equal to the threshold, the one or more processors are also configured to execute the instructions to cause the processor to determine the second version of the file utilized by the target node. Alternatively, if the size of the file is less than the threshold, the one or more processors are also configured to execute the instructions to cause the processor to send an entirety of the first version of the file to the target node.

In some implementations, the one or more processors are also configured to execute the instructions to cause the processor to receive, at the source node, a request to replicate the first version of the file at the target node, determine a file type of the first version of the file, and determine whether the file type is one of a plurality of supported file types. If the file type is included in the plurality of supported file types, the one or more processors are also configured to execute the instructions to cause the processor to determine the second version of the file utilized by the target node. Alternatively, if the file type is not included in the plurality of supported file types, the one or more processors are also configured to execute the instructions to cause the processor to send the first version of the file to the target node. In some such implementations, to send the first version of the file to the target node, the one or more processors are further configured to execute the instructions to cause the one or more processors to determine a size of the first version of the file and perform a comparison between the size and a threshold. If the size of the first version of the file is less than or equal to the threshold, the one or more processors are also configured to execute the instructions to cause the processor to send an entirety of the first version of the file to the target node. Alternatively, if the size of the first version of the file is greater than the threshold, the one or more processors are also configured to execute the instructions to cause the processor to divide the first version of the file into multiple portions and send each portion of the multiple portions to the target node. In some such implementations, at least two portions of the multiple portions are sent concurrently to the target node.

According to another embodiment, a computer program product is described that includes a computer-readable storage device, such as a non-transitory computer-readable storage medium, that includes instructions that, when executed by one or more processors (e.g., 304), cause the one or more processors to perform operations for replicating one or more files at a target node (e.g., 330). The operations include executing a first routine to identify first replication information (e.g., 310) comprising a first plurality of checksums (e.g., 324) corresponding to a first version of a file (e.g., 322) utilized by a first node (e.g., 302). The operations further include executing a second routine to identify second replication information (e.g., 372) comprising a second plurality of checksums (e.g., 354) corresponding to a second version of the file (e.g., 352) utilized by a second node (e.g., 330). The operations also include executing a third routine to calculate a difference between the first version of the file and the second version of the file, executing a fourth routine to, based on the calculated difference, identify update data (e.g., parts of update data 364) that is included in the first version of the file and not included in the second version of the file, and executing a fifth routine to transmit, to the second node, the update data. In some such implementations, the second node (e.g., target node) comprises an Internet of things (IoT) device.

In some implementations, the fifth routine to send the update data as one or more portions includes sending a first portion of the update data and sending a second portion of the update data. In some such implementations, the first portion of the update data and the second portion of the update data are sent in parallel and/or the first version of the file comprises a zip file. Additionally, or alternatively, in some implementations, the operations further include to send, to the second node, a request for identification of a particular version of the file utilized by the second node. In a particular implementation, the operations further include to send, to the second node, a request (e.g., 370) for particular replication information corresponding to the file utilized by the second node and, responsive to the request, receive the second replication information.

According to yet another embodiment, a system (e.g., 300) for replicating one or more files at a target node (e.g., 330) is described. The system includes at least one memory (e.g., 350) storing instructions and one or more processors (e.g., 332) coupled to the at least one memory. The one or more processors are configured to execute the instructions to cause the one or more processors to receive, from a source node (e.g., 302) having source replication information (e.g., 310) corresponding to a first version of a file (e.g., 322), a request (e.g., 370) for target replication information (e.g., 372) corresponding to a second version of the file (e.g., 352).

The source replication information comprises a first plurality of checksums (e.g., 324) corresponding to the first version of the file utilized by the source node. The target replication information comprises a second plurality of checksums (e.g., 354) corresponding to the second version of the file utilized by the target node. The one or more processors are further configured to execute the instructions to cause the one or more processors to send the target replication information (e.g., 372) to the source node, receive the source replication information (e.g., 310) from the source node, and receive update data (e.g., parts of update data 364) corresponding to a difference between the first version of the file and the second version of the file from the source node. The one or more processors are also configured to execute the instructions to cause the one or more processors to combine, based on the source replication information, the update data and a portion (e.g., parts of data 362) of the second version of the file that is the same between the first version of the file and the second version of the file to generate a third version of the file. In some such implementations, the first version of the file utilized by the source node comprises a file name and a first version identifier, and the second version of the file utilized by the target node comprises the file name and a second version identifier. Additionally, or alternatively, the second version of the file includes a plurality of parts, each of the plurality of parts including a set of data blocks; and each of the plurality of parts corresponding to a checksum.

In some implementations, the one or more processors are further configured to execute the instructions to cause the one or more processors to verify the third version of the file matches the first version of the file. To where verify the third version of the file matches the first version of the file, the one or more processors are further configured to execute the instructions to cause the one or more processors to generate a checksum for an entirety of the third version of the file and identify, based on the source replication information, a checksum for an entirety of the first version of the file. In some such implementations, the one or more processors are further configured to execute the instructions to cause the one or more processors to compare the checksum for the entirety of the third version of the file and the checksum for the entirety of the first version of the file to determine whether the third version of the file matches the first version of the file.

In some implementations, the one or more processors are further configured to execute the instructions to cause the one or more processors to, in response to a determination that the third version of the file matches the first version of the file, send, from the target node, an acknowledgement to the source node and store the third version of the file at a memory (e.g., 350) of the target node. Alternatively, the one or more processors are further configured to execute the instructions to cause the one or more processors to, in response to a determination that the third version of the file does not match the first version of the file, send, from the target node, a notification to the source node; and discard the third version of the file.

According to another embodiment, a computer program product is described that includes a computer-readable storage device, such as a non-transitory computer-readable storage medium, that includes instructions that, when executed by one or more processors (e.g., 332), cause the one or more processors to perform operations for replicating one or more files at a target node (e.g., 330). The operations include executing a first routine to receive, from a source node (e.g., 302) having source replication information (e.g., 310) corresponding to a first version of a file (e.g., 322), a request (e.g., 370) for target replication information (e.g., 372) corresponding to a second version of the file (e.g., 352). The source replication information comprising a first plurality of checksums (e.g., 324) corresponding to the first version of the file utilized by the source node. The target replication information comprising a second plurality of checksums (e.g., 354) corresponding to the second version of the file utilized by the target node. The operations further include executing a second routine to send the target replication information (e.g., 372) to the source node. The operations also include executing a third routine to receive the source replication information (e.g., 310) from the source node, executing a fourth routine to receive update data (e.g., parts of update data 364) corresponding to a difference between the first version of the file and the second version of the file from the source node, and executing a fifth routine to combine, based on the source replication information, the update data and a portion (e.g., parts of data 362) of the second version of the file that is the same between the first version of the file and the second version of the file. In some such implementations, the request includes an identifier of the file.

In some implementations, the operations further include to, prior to sending the target replication information, identify a version indicator of the second version of the file, and send the version indicator of the second version of the file to the source node. Additionally, or alternatively, in some implementations, the fourth routine to receive the update data further comprises operations to receive a first portion of multiple portions of the update data, receive a second portion of the multiple portions of the update data, and receive a third portion of the multiple portions of the update data. In some such implementations, the first portion of the multiple portions may correspond to a first checksum, the second portion of the multiple portions may correspond to the first checksum, and the third portion of the multiple portions may correspond to a second checksum.

In some implementations, the operations further include to, after receipt of the source replication information, compare the source replication information to the target replication information to identify one or more checksums included in both the source replication information and the target replication information and, for each of the one or more checksums, retrieve a corresponding part (e.g., parts of data 362) of the second version of the file at the target node. Additionally, or alternatively, the update data may include multiple portions and the update data is combined with the portion of the second version of the file that is the same between the first version of the file and the second version of the file in response to a determination that each portion of the multiple portions of the update data is received.

Thus, system 300 describes efficiently, consistently, and securely replicating one or more files (available to source device 302) at target device 330. For example, target device 330 can provide second replication information 372 to enable source device 302 to determine a difference between a first version of a file and a second version of the file. Based on a difference between the different versions of the file, source device 302 identifies one or more portions (e.g., parts data update 364) of the file (to be replicated at target device 330). To illustrate, source device 302 does not have to send an entity of the first version of the file to be replicated to target device 330. Because only files (e.g., artifacts) that are not already stored at target device 330 are transmitted between devices (e.g., via a network), network bandwidth usage as compared to transmitting an entirety of a software release is reduced, which may enable distribution in situations with limited network bandwidth or other network issues. To enable target device 330 to replicate the intended version of the file, source device 302 provides first replication information 310 to target device 330. Based on first replication information 310, target device 330 can advantageously assemble and verify the version of the file to be replication at target device 330. Thus, system 300 of FIG. 3 described herein utilizes a replication process to efficiently, consistently, and securely replicate one or more files at target device 330.

Figure 4:
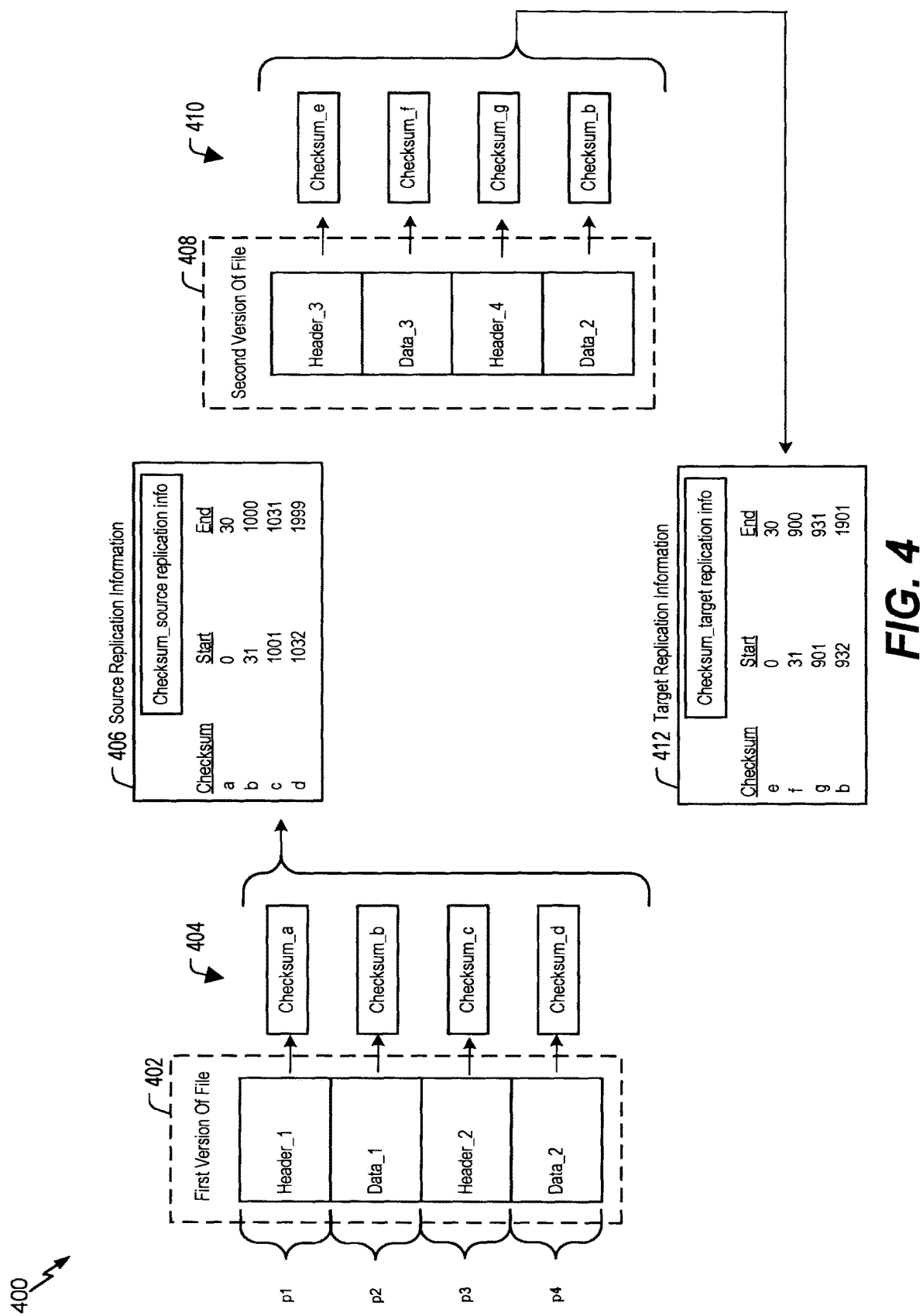
FIG. 4 illustrates an example of replication information corresponding to a source node and replication information corresponding to a target node.

Referring to FIG. 4, an example of replication information corresponding to a source node and replication information corresponding to a target node is depicted and generally designated 400. The various replication information may be generated by server 110, server 168, node device 160, 160a, 160b, 160c, 160d, source device 302, and/or target device 330, as non-limiting examples.

In FIG. 4, a first version 402 of a particular file may be stored at a source device, such as source device 302 of FIG. 3 as a non-limiting example. First version 402 includes one or more parts (e.g., portions). Each part may include a header or a data portion (e.g., block) of the particular file. In a particular implementation, first version 402 includes four parts: "p1," "p2," "p3," and "p4." For example, p1 includes a first header "Header_1", p2 includes a first data portion "Data_1," p3 includes a second header "Header_2," and p4 includes a second data portion "Data_2." Although four parts are shown, in other implementations, fewer than four or more than four parts may be included in first version 402.

To generate replication information at the source device, one or more checksums 404 are generated based on the parts of first version 402. For example, a first checksum "checksum_a" may be generated based on "Header_1," a second checksum "checksum_b" may be generated based on "Data_1," a third checksum "checksum_c" may be generated based on "Header_2," and a fourth checksum "checksum_d" may be generated based on "Data_2." In a particular implementation, checksums 404 are generated by checksum generator 306.

Checksums 404 are included in source replication information 406. In addition to the checksums, start indicators and end indicators for each part are included in source replication information 406. To illustrate, source replication information 406 includes a first checksum (checksum_a), a first start indicator (0) and a first end indicator (30) that correspond to the first checksum (e.g., to the first part), a second checksum (checksum_b), a second start indicator (31) and a second end indicator (1000) that correspond to the second checksum (e.g., to the second part), a third checksum (checksum_c), a third start indicator (1001) and a third end indicator (1031) that correspond to the third checksum (e.g., to the third part), a fourth checksum (checksum_d), and a fourth start indicator (1032) and a fourth end indicator (1999) that correspond to the fourth checksum (e.g., to the fourth part). The start indicators and the end indicators may indicate a size and location of the corresponding part within the first version 402 of the particular file. Source replication information 406 also includes a checksum ("checksum source replication information") that is generated based on an entirety of first version 402 (e.g., based on the complete file).

Additionally, a second version 408 of the particular file may be stored at a target device, such as target device 330 of FIG. 3, as a non-limiting example. Second version 408 includes one or more parts, which may each include a header or a data portion of the particular file. In a particular implementation, second version 408 includes four parts: a fifth part that includes a third header "Header_3," a sixth part that includes a third data portion "Data_3," a seventh part that includes a fourth header "Header_4," and an eighth part that includes the second data portion "Data_2." Although four parts are shown, in other implementations, fewer than four or more than four parts may be included in second version 408.

To generate replication information at the target device, one or more checksums 410 are generated based on the parts of second version 408. For example, a fifth checksum "checksum_e" may be generated based on "Header_3," a sixth checksum "checksum_f" may be generated based on "Data_3," a seventh checksum "checksum_g" may be generated based on "Header_4", and the second checksum "checksum b" may be generated based on "Data_2." In a particular implementation, checksums 410 are generated by checksum generator 338.

Checksums 410 are included in target replication information 412. In addition to the checksums, start indicators and end indicators for each part are included in target replication information 412. To illustrate, target replication information 412 includes a fifth checksum (checksum_e), a fifth start indicator (0) and a fifth end indicator (30) that correspond to the fifth checksum (e.g., to the fifth part), a sixth checksum (checksum_f), a sixth start indicator (31) and a sixth end indicator (900) that correspond to the sixth checksum (e.g., to the sixth part), a seventh checksum (checksum_g), a seventh start indicator (901) and a seventh end indicator (931) that correspond to the seventh checksum (e.g., to the seventh part), the second checksum (checksum_b), and an eighth start indicator (932) and an eighth end indicator (1901) that correspond to the second checksum (e.g., to the eighth part). Target replication information 412 also includes a checksum ("checksum target replication information") that is generated based on a entirety of second version 408 (e.g., based on the complete file).

Target replication information 412 may be sent from the target device to the source device to enable the source device to determine a difference between source replication information 406 and target replication information 412, as described with reference to FIG. 3. In the example of FIG. 4, the source device may determine that the target device does not store parts p1, p3, and p4 (based on checksum_a, checksum_c, and checksum_d not being included in target replication information 412). Thus, to replicate first version 402, parts p1, p3, and p4 may be transmitted to the target device. The target device may also receive source replication information 406 and use source replication information 406 (e.g., the start indicators and the end indicators) to assemble the particular file when the parts are received, as described with reference to FIG. 3.

Thus, FIG. 4 illustrates source replication information 406 and target replication information 412. As described with reference to FIG. 3, this replication information may be used during a file replication process to determine which parts of files are to be transmitted and how to assemble a file once the parts are received.

Figure 5:
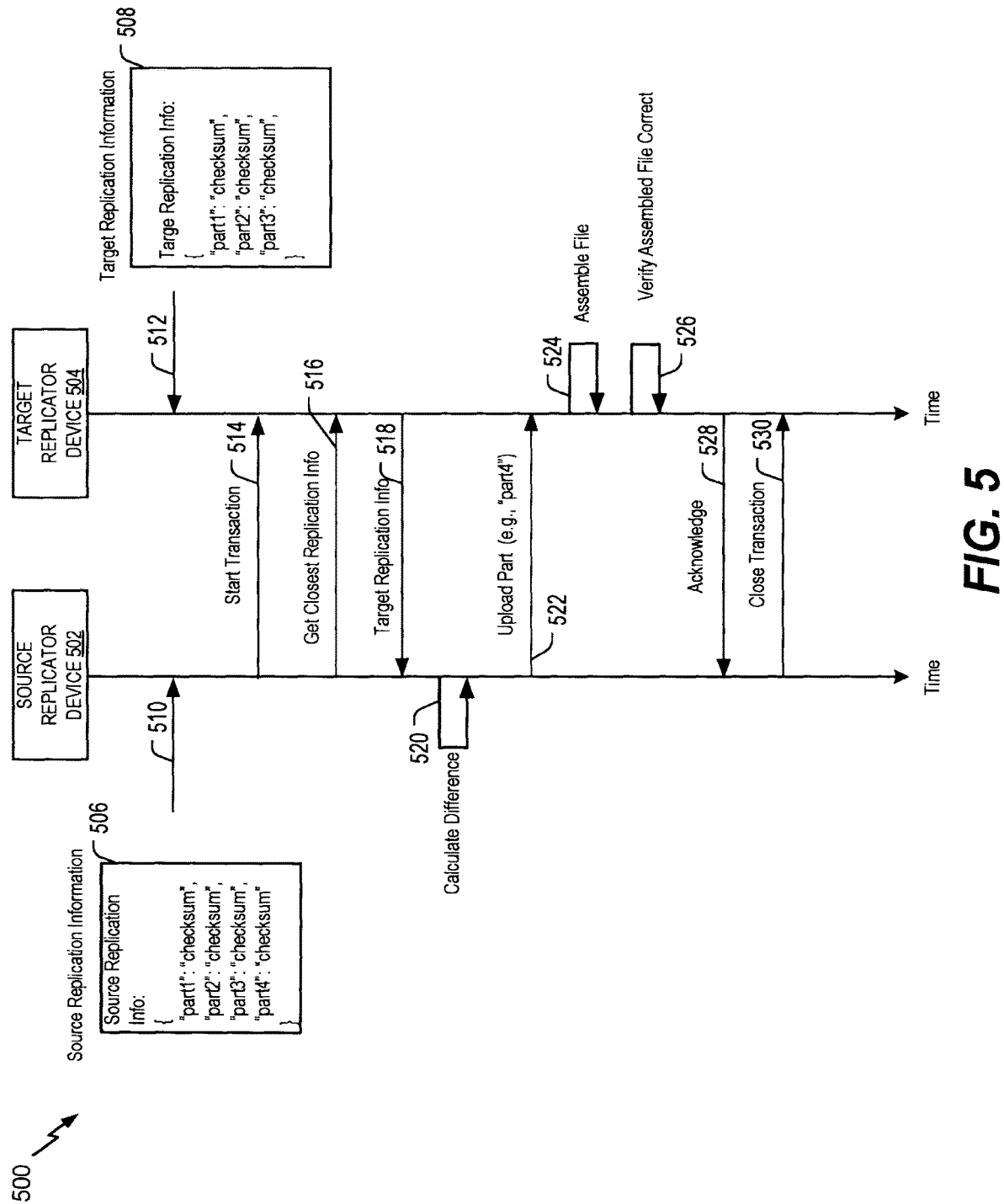
FIG. 5 is a ladder diagram to illustrate an example of replication of a file.

Referring to FIG. 5, a ladder diagram illustrating an example of replicating a file is depicted and generally designated as ladder diagram 500. The ladder diagram 500 includes or corresponds to system 100, 200, 300. As shown, a system of ladder diagram 500 includes a source replicator device 502 and a target replicator device 504.

In a particular implementation, source replicator device 502 may be included in (or have the operations performed by) server 110, source device 302, and target replicator device 504 may be included in (or have the operations performed by) node device 160, 160a, 160b, 160c, 160d, server 168, and/or target device 330. For example, source replicator device 502 may include or correspond to replicator 254, and target replicator device 504 may include or correspond to replicator 334.

During operation, source replicator device 502 generates source replication information 506 at 510. Source replication information 506 may include one or more checksums for one or more parts of a file included in a software release (or any kind of software update/distribution), a start identifier and an end identifier (e.g., a size identifier), a checksum for an entirety of the file, and a size indicator for the entirety of the file, as described with reference to FIGS. 3-4. In the implementation illustrated in FIG. 5, source replication information 506 includes checksums for four particular parts of a particular file: "part1," "part2," "part3," and "part4." Source replication information 506 may be generated responsive to a command to perform a software release distribution or to update a version of software on a target device (such as between two servers). Additionally, or alternatively, source replication information may be generated and stored by a source release device and retrieved by source replicator device 502 when replication is initiated.

At 512, target replicator device 504 generates target replication information 508 for the most recent version of a particular the particular file that is stored at target replicator device 504 (or a device coupled to target replicator device 504, such as a node device). Target replication information 508 may include one or more checksums for one or more parts of the particular file, one or more start indicators and one or more end indicators (e.g., one or more size indicators), a checksum for an entirety of the file, and a size indicator for an entirety of the file. In the implementation illustrated in FIG. 5, target replication information 508 includes checksums for three particular parts:, "part1," "part2", and "part3."

At 514, source replicator device 502 starts a transaction with target replicator device 504. For example, source replicator device 502 may initiate a communications session with target replicator device 504. Starting the transaction may include sending source replication information 506 to target replicator device 504. After starting the transaction, at 516, source replicator device 502 sends a request for the closest replication information to target replicator device 504. For example, source replicator device 502 may send a request for target replication information 508. Although generation of target replication information 508 is illustrated as occurring at 512, in other implementations, target replicator device 504 generates target replication information 508 in response to receiving the request for the closest replication information at 516. At 518, target replicator device 504 transmits target replication information 508 to source replicator device 502.

At 520, source replicator device 502 compares target replication information 508 to source replication information 506 to determine if there is a difference. A difference indicates that at least one part of the particular file (e.g., artifact) that is included in the release bundle (or other software update) is not stored at target replicator device 504 (or a device coupled to target replicator device 504). For example, in the implementation of FIG. 5, source replicator device 502 may determine the difference as "part4" because target replication information 508 does not include a checksum that corresponds to "part4." If a difference is identified, the one or more missing parts are uploaded from source replicator device 502 to target replicator device 504, at 522. For example, source replicator device 502 may upload "part4" to target replicator device 504. In a particular implementation, "part4" may be sent in a single transmission packet. Alternatively, "part4" may be divided into multiple transmission packets that may be sent sequentially or concurrently.

At 524, target replicator device 504 assembles the file. For example, target replicator device 504 combines the received part (e.g., "part4") with the other parts (e.g., "part1," "part2," and "part3") of the most recent version to form a new version of the particular file. Target replicator device 504 may assemble the file based on source replication information 506, which includes start indicators and end indicators associated with each part of the file, or based on an order of the checksums in source replication information 506. At 526, target replicator device 504 verifies that the assembled file is correct (e.g., that the assembled file matches the version of the file stored at source replicator device 502). For example, target replicator device 504 may generate checksums for each part of the reconstructed file and compare the checksums to checksums received from source replicator device 502 (e.g., in source replication information 506). If the checksums match, the assembled file may be verified. Additionally, or alternatively, target replicator device 504 may generate a single checksum based on an entirety of the assembled file and compare the generated checksum to a checksum received from source replicator device 502 (e.g., included in source replication information 506 and that corresponds to an entirety of the file). If the generated checksum matches the received checksum, the release information is verified.

At 528, target replicator device 504 acknowledges receipt of the uploaded file to source replicator device 502. For example, target replicator device 504 may send an acknowledgement message to source replicator device 502 if the file is assembled correctly and the replication information is verified. If a problem occurs, target replicator device 504 may send a negative acknowledgement message to source replicator device 502, and source replicator device 502 may retry uploading the one or more parts. If more files are to be replicated, 516-528 may be repeated. If no more files are to be replicated, source replicator device 502 closes the transaction, at 530. For example, source replicator device 502 may terminate a communications session between source replicator device 502 and target replicator device 504.

Thus, FIG. 5 demonstrates how replication of a file and distribution of parts of the replicated file occurs between source replicator device 502 and target replicator device 504. Because only parts of files (e.g., artifacts) that are not already stored at target replicator device 504 (or a device coupled to target replicator device 504) are transmitted between devices (e.g., via a network), network bandwidth usage as compared to transmitting an entirety of a file is reduced, which may enable distribution in situations with limited network bandwidth or other network issues.

Figure 6:
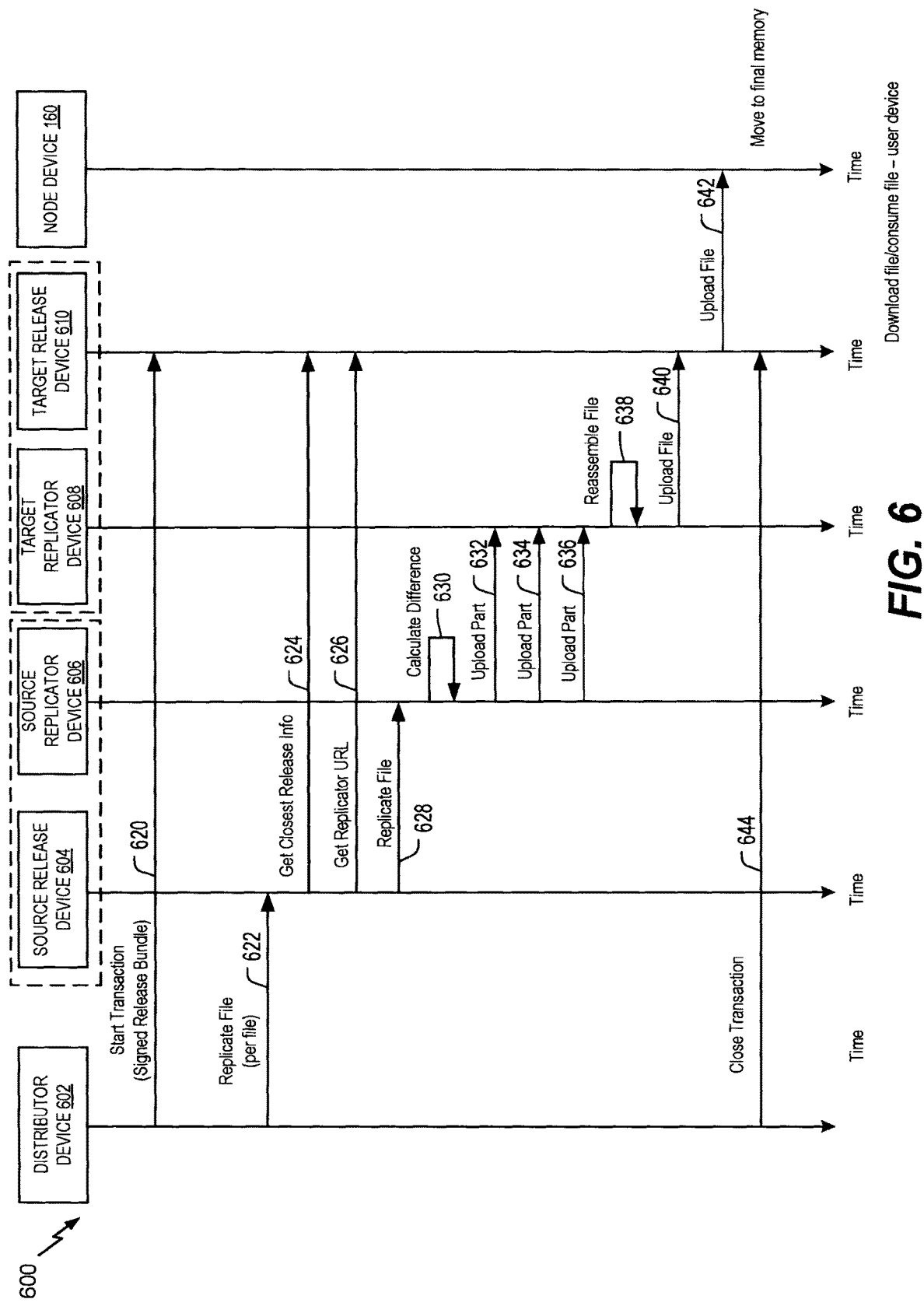
FIG. 6 is a ladder diagram to illustrate an example of replication preformed in association with a distribution transaction for a software release.

Referring to FIG. 6, a ladder diagram illustrating an example of replication performed in association with a distribution transaction for a software release is depicted and generally designated as ladder diagram 600. For example, the ladder diagram 600 depicts an example to illustrate file replication during distribution of a signed release bundle/ signed release bundle information. The ladder diagram 600 includes or corresponds to system 100, 200, 300. As shown, a system of ladder diagram 600 includes a distributor device 602, a source release device 604, a source replicator device 606, a target replicator device 608, a target release device 610, and a node device 160.

In a particular implementation, some of the components 602-610 may be included in (or have the operations performed by) entity 150, 150a, 150b, server 110, source device 302, node device 160, 160a, 160b, 160c, 160d, server 168, target device 330, and/or an intermediate receiving device (e.g., a second provider server or a customer server). For example, distributor device 602 may include or correspond to entity 150, 150a, 150b. Source release device 604 and source replicator device 606 may include or correspond to server 110 and/or source device 302. To illustrate, source release device 604 may include or correspond to manager 252 and/or deployer 253 and source replicator device 606 may include or correspond to replicator 254. Target replicator device 608 and target release device 610 may correspond to one or more other devices, such as server 168 or another server (which includes a replicator and, optionally, a deployer). In an alternate implementation, target replicator device 608 and target release device 610 are incorporated in node device 160, 160a, 160b, 160c, 160d (e.g., as modules or instructions executed by a processor of node device 160).

During operation, at 620, distributor device 602 starts a distribution transaction with target release device 610. Distributor device 602 may start the transaction by initiating a release bundle distribution with source release device 604, and source release device 604 may initiate a communication session with target release device 610 (or the device that includes target release device 610).

Distributor device 602 initiates replication of the files corresponding to the release bundle, at 622. Responsive to the initiation, source release device 604 may fetch the artifacts and meta data from memory, and retrieve information regarding the node devices, such as discovering node devices. Source release device 604 may also generate release bundle information (e.g., checksums and meta data) for the artifacts in the release bundle.

Source release device 604 gets closest release information from target release device 610, at 624. For example, source release device 604 may transmit the release bundle information to target release device 610. The release bundle information may include checksums and meta data associated with the artifacts (e.g., files) in the release bundle. Target release device 610 may receive the release bundle information and generate checksums based on artifacts (e.g., files) stored at target release device 610 (or at node device 160). Target release device 610 may compare the generated checksums to the received checksums to determine if any of the artifacts of the release bundle are not stored at target release device 610 (or at node device 160). In some implementations, responsive to a get request, target release device 610 obtains bundle request information for a most recent bundle release received at target release device 610 (e.g., node device 160) and sends the most recent bundle request information to source release device 604 (e.g., source replicator device 606). In some implementations, source release device 604 receives the most recent bundle release information from target release device 610 and provides the most recent bundle release information to source replicator device 606.

Source release device 604 gets a replicator uniform resource locator (URL), at 626. The replicator URL may indicate a location/address of target replicator device 608 corresponding to target release device 610 (e.g., node device 160). For example, responsive to a get replicator URL request, the replicator URL may be provided to source release device 604. In some implementations, source release device 604 receives the replicator URL (of target replicator device 608) from target release device 610 and provides the replicator URL to source replicator device 606.

For any artifacts (e.g., files) in the release bundle for which no other version is stored at target release device 610, source release device 604 initiates replication of the full artifact and uploading of the full artifact to target replicator device 608. For any files for which a different version is stored at target release device 610, source release device replicates a file, at 628. For example, source release device 604 may initiate replication. Source replicator device 606 calculates a difference between the replicated file and the file stored at target release device 610 (or node device 160), at 630. For example, source replicator device 606 may receive replication information for the file from target replicator device 608 and compare the received replication information and the replication information generated (or accessed) by source replicator device 606 for the replicated file. Calculating the difference includes determining which parts of the file are not currently stored at target release device 610 (or node device 160). After determining the list of missing parts, source replicator device 606 uploads the missing parts (e.g., portions) to target replicator device 608 at 632, 634, and 636. As an illustrative example, three parts (e.g., one or more portions) are uploaded. In other implementations, more than three or fewer than three parts can be uploaded. In some implementations, multiple parts may be uploaded in a single transmission package. Additionally, or alternatively, some parts may be divided among multiple transmission packets.

Target replicator device 608 reassembles the file, at 638. For example, target replicator device 608 combines the uploaded parts with the parts already stored at target release device 610 (or node device 160) to recreate the artifact (e.g., file). To illustrate, target replicator device 608 may reassemble the file based on source replication information received from source release device 604. In some implementations, 628-638 may be repeated for any additional files for which a different version is stored at target release device 610 (or node device 160). After all the artifacts and parts of artifacts are received, target replicator device 608 assembles the release bundle. To illustrate, target replicator device 608 may assemble the artifacts based on release bundle information (for the distribution transaction). In this manner, only the artifacts (or parts of artifacts) that are not already stored are transmitted between devices, thus reducing network bandwidth requirements. After the release bundle is assembled, target replicator device 608 uploads the file to target release device 610, at 640. Target release device 610 uploads the release bundle to node device 160 at 642. As the release bundle is received at node device 160, it may be stored in temporary storage, such as transaction directory 360 (e.g., a temporary transaction directory). After the full file is received, and optionally verified, the file may be moved to memory 350.

After distribution is complete, distributor device 602 closes the transaction, at 644. For example, distributor device 602 may cause source release device 604 to close (e.g., terminate) a communication session.

Thus, FIG. 6 demonstrates how replication of a file during distribution of a software release occurs between distributor device 602, source release device 604, source replicator device 606, target replicator device 608, target release device 610, and node device 160. In the implementation illustrated in FIG. 6, only artifacts and/or parts of artifacts that are not already stored at target release device 610 (or node device 160) are transmitted between devices (e.g., via a network), which reduces network bandwidth usage as compared to transmitting an entirety of a release bundle (or an entirety of a file/artifact).

Figure 7:
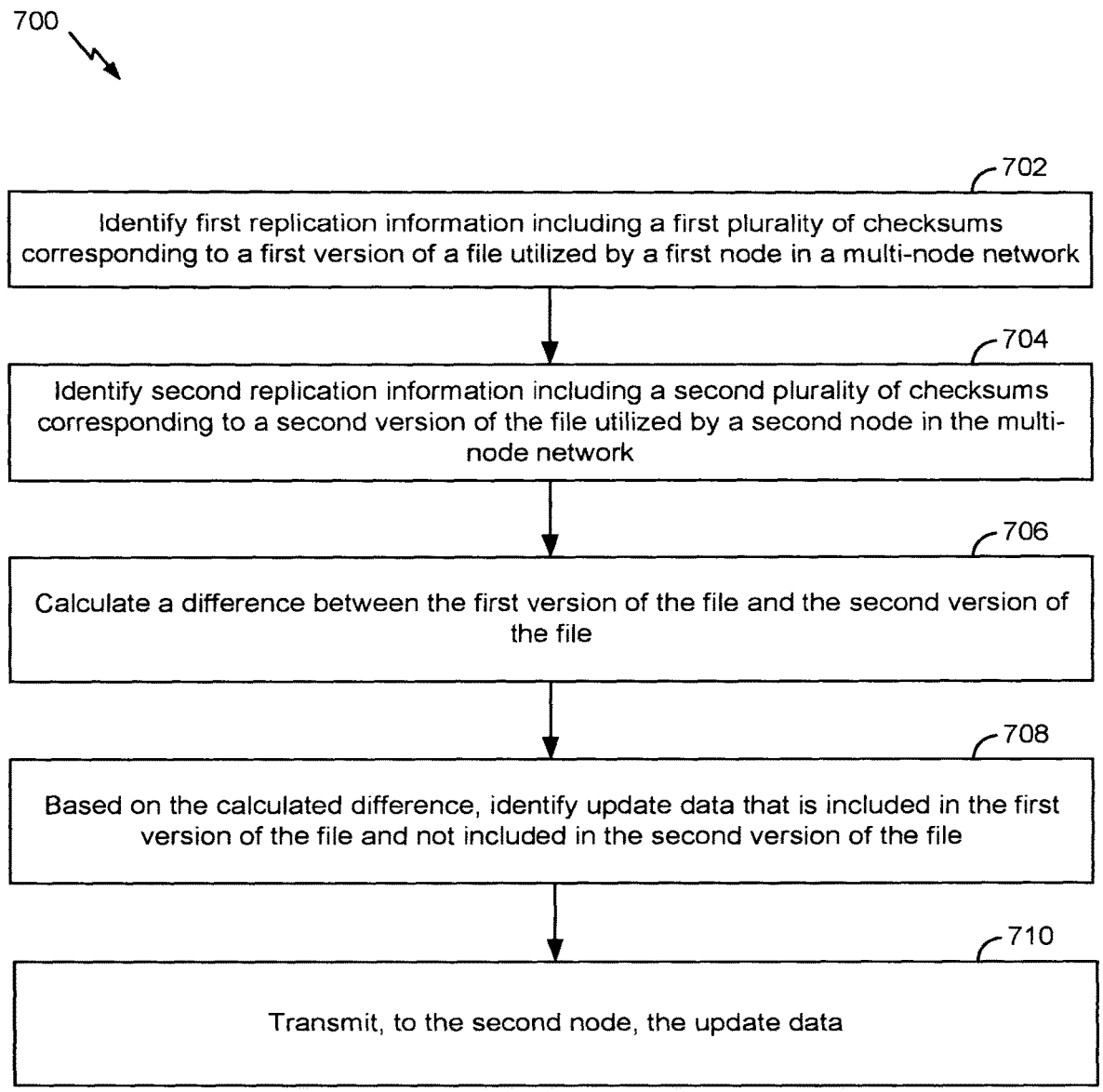
FIG. 7 is a flow diagram of an example of a method for replicating one or more files.
Figure 8:
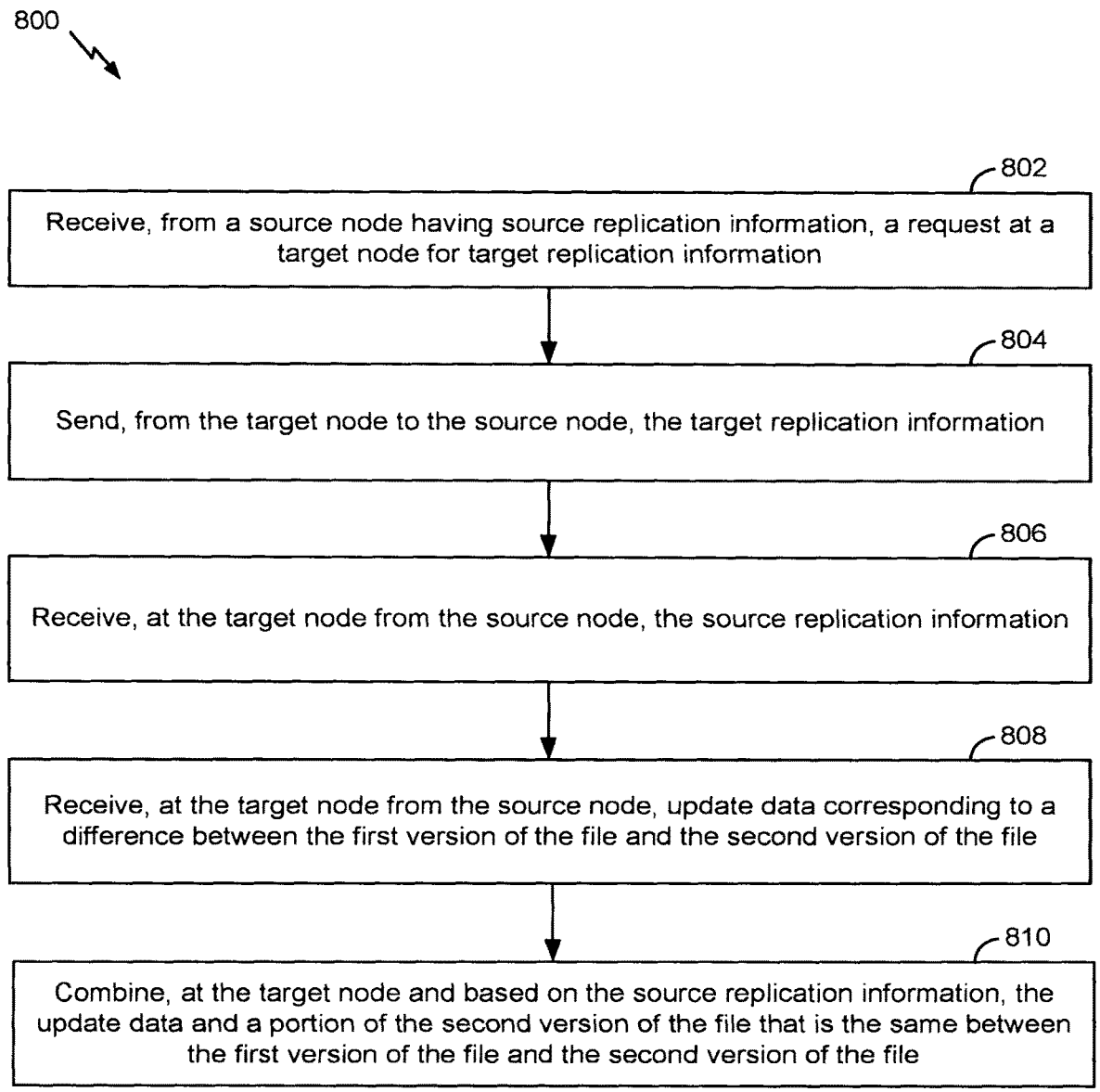
FIG. 8 is a flow diagram of another example of a method for replicating one or more files.

FIGS. 7-8 are flow diagrams of methods of replicating one or more files. Each of the methods of FIGS. 7-8 may be stored in a computer-readable storage medium as instructions that, when executed by one or more processors, cause the one or more processors to perform the operations of the method (e.g., 700, 800).

Referring FIG. 7 is a flow diagram of a method for replicating one or more files across a multi-node network according to an embodiment is shown as a method 700. In a particular implementation, method 700 may be performed by server 110 (e.g., one or more processors 250, processor 304, and/or replicator 254), server 168 (e.g., a processor and/or a module), source device 302, target device 330, source replicator device 502, target replicator device 504, source release device 604, source replicator device 606, target replicator device 608, and/or target release device 610.

At 702, method 700 includes identifying first replication information including a first plurality of checksums corresponding to a first version of a file utilized by a first node in the multi-node network. For example, source device 302 (e.g., processor 304 and/or replication information generator 308) may identify first replication information 310. First replication information 310 may include a plurality of file checksums 324 that correspond to a file of files 322.

At 704, method 700 includes identifying second replication information including a second plurality of checksums corresponding to a second version of the file utilized by a second node in the multi-node network. For example, source device 302 may receive second replication information 372 from target device 330. Second replication information 372 may include a plurality of file checksums 354 that correspond to a file of files 352.

At 706, method 700 includes calculating a difference between the first version of the file and the second version of the file. For example, source device 302 (e.g., processor 304 and/or difference calculator 312) may calculate a difference between first replication information 310 and second replication information 372.

At 708, method 700 includes, based on the calculated difference, identifying update data that is included in the first version of the file and not included in the second version of the file. For example, source device 302 identifies parts of update data 364 (e.g., one or more parts of the file that are included in the first version and not included in the second version).

At 710, method 700 further includes transmitting, to the second node, the update data. For example, source device 302 transmits parts of update data 364 to target device 330.

In a particular implementation, the first version of the file utilized by the first node includes a file name and a first version identifier, and the second version of the file utilized by the second node includes the file name and a second version identifier. In some such implementations, the first node and the second node use a shared naming convention. For example, source device 302 and target device 330 may use a shared naming convention such that the first file has a file name and a first version identifier and the second file has the file name and a second version identifier. Additionally, or alternatively, method 700 also includes determining the first version of the file utilized by the first node corresponds to a source node and determining the second version of the file utilized by the second node corresponds to a target node.

In a particular implementation, method 700 also includes receiving, at the first node, an acknowledgment from the second node that the update data was received. For example, with reference to FIG. 5, source replicator device 502 may receive an acknowledgement from target replicator device 504 at 528.

In a particular implementation, method 700 also includes receiving, at the first node, a notification from the second node that at least a portion of the update data was not received, and responsive to the notification, transmitting the portion of the update data to the second node. For example, target device 330 may send a notification that at least some of parts of update data 364 was not received, and source device 302 may retransmit the missing portions to target device 330.

In a particular implementation, the first version of the file includes a plurality of parts, each of the plurality of parts including an optional set of headers and a set of data blocks. For example, the file may include headers and data portions (e.g., blocks), as described with reference to FIG. 4. In some such implementations, the update data includes multiple parts of the plurality of parts, and each part of the multiple parts is individually sent to the second node. For example, each part of the parts of update data 364 may be sent individually as one or more transmission packets. Alternatively, the update data includes multiple parts of the plurality of parts, and the multiple parts are sent together to the second node. For example, one or more parts may be combined in a single transmission packet and sent to target device 330. Additionally, or alternatively, at least one part of the plurality of parts includes a header.

In some implementations, the first replication information includes, for each part, a checksum and a size indicator. For example, source replication information 406 includes one or more checksums 404 and size indicators. In some such implementations, the first replication information includes a first checksum for an entirety of the first version of the file. For example, source replication information 406 includes checksum "checksum source replication information." In some such implementations, the size indicator for a particular part includes a start location of the particular part within the first version of the file and an end location of the particular part within the first version of the file. For example, source replication information 406 includes the start indicators (e.g., locations) and end indicators (e.g., locations), as illustrated in FIG. 4.

In a particular implementation, calculating the difference includes identifying one or more checksums of the first replication information not included in the second plurality of checksums included in the second replication information. For example, with reference to FIG. 4, cheksum_a, checksum_c, and checksum_d may be identified as the difference between source replication information 406 and target replication information 412. In some such implementations, method 700 includes, for each of the one or more checksums, identifying a corresponding size indicator of the file for the checksum, and retrieving a portion of the first version of the file based on the identified corresponding size. In some such implementations, method 700 includes identifying additional replication information corresponding to the second node, the additional replication information accessible to the first node. In some such implementations, method 700 further includes comparing the one or more checksums to a plurality of checksums included in the additional replication information.

In a particular implementation, determining the second version of the file includes sending, to the second node, a request to the second node for a version identifier of the second version of the file at the second node. The request includes a file name of the file. In this implementation, determining the second version of the file also includes receiving, from the second node, a response including the version identifier and identifying the second version based on the version identifier. For example, source device 302 may send a request for a version identifier to target device 330. In some such implementations, determining the second version of the file comprises accessing a version log maintained by the first node to identify the second version of the file stored at a memory of the first node. For example, transaction log 224 may be accessed to identify the second version of the file.

In a particular implementation, method 700 also includes receiving an upload of the first version of the file at the first node; and responsive to the upload of the first version of the file, generating the update data. For example, source device 302 may receive an upload of a file of files 322 and generates parts of update data 364 responsive to the upload. Additionally, or alternatively, method 700 includes receiving, at the first node, a request to replicate the first version of the file at the second node and determining a size of the first version of the file. In this implementation, method 700 includes performing a comparison between the size and a threshold, and, if the size of the file is greater than or equal to the threshold, determining the second version of the file utilized by the second node. In this implementation, method 700 further includes, if the size of the file is less than the threshold, sending an entirety of the first version of the file to the second node. For example, if the size of a file to be replicated is less than threshold, an entirety of the file sent to target device 330, otherwise only parts of the file that are not stored at target device 330 are sent to target device 330.

In a particular implementation, method 700 includes receiving, at the first node, a request to replicate the first version of the file at the second node and, determining a file type of the first version of the file. In this implementation, method 700 includes determining whether the file type is one of a plurality of supported file types, and, if the file type is included in the plurality of supported file types, determining the second version of the file utilized by the second node. In this implementation, method 700 further includes, if the file type is not included in the plurality of supported file types, sending the first version of the file to the second node. For example, if the file is an unsupported file type, source device 302 sends an entirety of the file to target device 330, otherwise, source device 302 determines one or more parts of the file to send to target device 330. In some such implementations, sending the first version of the file to the second node includes determining a size of the first version of the file and performing a comparison between the size and a threshold. In this implementation, if the size of the first version of the file is less than or equal to the threshold, an entirety of the first version of the file is sent to the second node, and, if the size of the first version of the file is greater than the threshold, the first version of the file is divided into multiple portions and each portion of the multiple portions is sent to the second node. For example, if the file size is less than or equal to a threshold, the file is sent as an entirety to target device 330, otherwise the file is divided into multiple portions that are sent to target device 330. In some such implementations, at least two portions of the multiple portions are sent concurrently to the second node. For example, parts of update data 364 may include multiple parts that are sent concurrently to target device 330. Alternatively, the multiple parts may be sent sequentially.

In a particular implementation, sending the update data includes sending a first portion of the update data and sending a second portion of the update data. For example, parts of update data 364 may include multiple parts. In some such implementations, the first portion of the update data and the second portion of the update data are sent in parallel. Additionally, or alternatively, the first version of the file includes a zip file. Additionally, or alternatively, method 700 also includes sending, to the first node, a request for identification of a particular version of the file utilized by the second node. For example, source device 302 may send a request for version information to target device 330.

In a particular implementation, method 700 also includes sending, to the first node, a request for particular replication information corresponding to the file utilized by the second node and, responsive to the request, receiving the second replication information. For example, source device 302 may send request 370 to target device 330 and receive second replication information 372 responsive to sending request 370.

Thus, method 700 describes how replication of files and distribution of replicated files occurs between a first device (e.g., a source replicator device) and a second device (e.g., a target replicator device). Because only parts of files (e.g., artifacts) that are not already stored at the second device (or a device coupled to the second device) are transmitted between devices (e.g., via a network), network bandwidth usage as compared to transmitting an entirety of a file is reduced, which may enable distribution in situations with limited network bandwidth or other network issues.

Referring FIG. 8 is a flow diagram of a method for replicating one or more files across a multi-node network according to an embodiment is shown as a method 800. In a particular implementation, method 800 may be performed by node device 160, 160a, 160b, 160c, 160d, server 168, server 110, target device 330 (e.g., processor 332 and/or replicator 334), source device 302 (e.g., processor 304 and/or replicator 254), target replicator device 504, source replicator device 502, target replicator device 608, target release device 610, source release device 604, and/or source replicator device 606.

At 802, method 800 includes receiving, from a source node having source replication information, a request at a target node for target replication information. The source replication information may correspond to a first version of a file utilized by the source node and may include a first plurality of checksums. The target replication information may correspond to a second version of the file utilized by the target node and may include a second plurality of checksums. For example, target device 330 may receive request 370 from source device 302. Source device 302 may identify or generate first replication information 310, and target device 330 may generate or identify second replication information 372. First replication information 310 may include a plurality of file checksums 324, and second replication information 372 may include a plurality of file checksums 354.

At 804, method 800 includes sending, from the target node to the source node, the target replication information. For example, target device 330 sends second replication information 372 to source device 302.

At 806, method 800 includes receiving, at the target node from the source node, the source replication information. For example, target device 330 receives first replication information 310 from source device 302.

At 808, method 800 includes receiving, at the target node from the source node, update data corresponding to a difference between the first version of the file and the second version of the file. For example, target device 330 receives parts of update data 364 from source device 302.

At 810, method 800 includes combining, at the target node and based on the source replication information, the update data and a portion of the second version of the file that is the same between the first version of the file and the second version of the file to generate a third version of the file. For example, target device 330 combines parts of update data 364 and parts of data 362 to generate a third version of the file. In some implementations, the third version of the file is identical to the first version of the file.

In a particular implementation, the request includes an identifier of the file. The identifier of the file may include a file name of the file. For example, request 370 may include an identifier, such as a file name, of the file for which replication information is being requested.

In a particular implementation, method 800 also includes, prior to sending the target replication information: identifying a version indicator of the second version of the file and sending the version indicator of the second version of the file to the source node. For example, target device 330 may identify a version indicator of the file and send the version indicator to source device 302. Additionally, or alternatively, method 800 may also include, responsive to receiving the request, retrieving the target replication information or generating the target replication information. For example, if second replication information 372 is already stored at memory 350 (e.g., as replication information 356), second replication information 372 may be retrieved. Alternatively, second replication information 372 may be generated, such as by a replication information generator included in replicator 334.

In a particular implementation, the update data includes multiple portions, and receiving the update data includes receiving a first portion of the multiple portions of the update data, receiving a second portion of the multiple portions of the update data, and receiving a third portion of the multiple portions of the update data. The first portion corresponds to a first checksum, the second portion corresponds to the first checksum, and the third portion corresponds to a second checksum. For example, one part may be split into multiple transmission packets by source device 302 to transmit to target device 330. Each of the transmission packets may include the same checksum in the header. In some such implementations, method 800 further includes, in response to receiving a first portion of the multiple portions of the update data, sending a first acknowledgement to the source node, in response to receiving a second portion of the multiple portions of the update data, sending a second acknowledgement to the source node, and in response to receiving a third portion of the multiple portions of the update data, sending a third acknowledgement to the source node. For example, target device 330 may send an acknowledgement after receipt of each part of parts of update data 364. Alternatively, target device 330 may send an acknowledgement after receipt of an entirety of parts of update data 364.

In some such implementations, method 800 also includes identifying a first position indicator corresponding to the first portion, identifying a second position indicator corresponding to the second portion, and combining the first portion and the second portion based on the first position indicator and the second position indicator. For example, target device 330 may identify position indicators (as illustrated in FIG. 4) included in first replication information 310 and use the position indicators to combine the parts of update data 364. In some such implementations, method 800 further includes arranging, based on the source replication information, the first portion and the second portion to generate the first version of the file at the target node. For example, target device 330 may use first replication information 310 (e.g., the position indicators) to arrange received parts of parts of update data 364 (and stored parts of parts of data 362) to form a third version of the file that is the same as the first version.

In some such implementations, method 800 also includes receiving one or more portions of the multiple portions of the update data and determining whether each portion of the multiple portions of the update data is received. For example, target device 330 may generate checksums based on the received parts and determine if the generated checksums (and checksums based on any stored parts) match all of the checksums in first replication information 310. In some such implementations, method 800 may include, in response to a determination that each portion of the multiple portions of the update data is not received: identifying an unreceived portion and sending a notification corresponding to the unreceived portion to the source node. For example, if target device 330 determines that at least one part has not been received, target device 330 may send a notification to source device 302. In some such implementations, the update data is combined with the portion of the second version of the file that is the same between the first version of the file and the second version of the file in response to a determination that each portion of the multiple portions of the update data is received. For example, in response to a determination that each part has been received, target device 330 combines parts of update data 364 with parts of data 362.

In a particular implementation, the update data and the portion of the second version of the file are combined based on an order of the first plurality of checksums of the source replication information. For example, parts of update data 364 and parts of data 362 may be combined based on an order of corresponding checksums in first replication information 310.

In a particular implementation, method 800 also includes verifying the third version of the file matches the first version of the file. Verifying the third version of the file matches the first version of the file may include generating a checksum for an entirety of the third version of the file, identifying, based on the source replication information, a checksum for an entirety of the first version of the file, and comparing the checksum for the entirety of the third version of the file and the checksum for the entirety of the first version of the file to determine whether the third version of the file matches the first version of the file. For example, with reference to FIG. 4, target device 330 may generate and compare "checksum_target replication information" to "checksum_source replication information" to verify whether the third version of the file matches the first version of the file. In some such implementations, method 800 further includes, in response to a determination that the third version of the file matches the first version of the file: sending, from the target node, an acknowledgement to the source node and storing the third version of the file at a memory of the target node. For example, an acknowledgement may be transmitted, as described at least with reference to FIG. 5, and the third version of the file may be stored at the memory 350. Alternatively, method 800 may further include, in response to a determination that the third version of the file does not match the first version of the file sending, from the target node, a notification to the source node and discarding the third version of the file. For example, target device 330 may send a notification to source device 302 and delete parts of update data 364 (and parts of data 362) from the transaction directory 360.

In a particular implementation, method 800 also includes, after receiving the source replication information: comparing the source replication information to the target replication information to identify one or more checksums included in both the source replication information and the target replication information, and for each of the one or more checksums, retrieving a corresponding part of the second version of the file at the target node. For example, after comparing second replication information 372 to first replication information 310, target device 330 may retrieve parts of data 362 (e.g., parts with matching checksums) from memory 350.

Thus, method 800 describes how replication of files and distribution of replicated files occurs between a source node and a target node. Because only parts of files (e.g., artifacts) that are not already stored at a target device (or a device coupled to the second device) are shared between devices (e.g., via a network), network bandwidth usage as compared to transmitting an entirety of a file is reduced, which may enable distribution in situations with limited network bandwidth or other network issues.

In some implementations, methods 700, 800 and/or operations described with reference to at least FIGS. 5-6 can be combined such that one or more operations described with reference to one of the methods of FIGS. 7-8 and one or more operations described above with reference to FIGS. 5-6 may be combined with one or more operations of another of FIGS. 7-8 and the processes of FIGS. 5-6. For example, one or more operations of method 700 may be combined with one or more operations of method 800. To illustrate, a first device (e.g., server 110) may be designated as a source device for replication of a first file and as a target device for replication of a second file (or the same file at a different time). As another example, one or more operations described above with reference to FIG. 5 may be combined with one or more operations of one of FIGS. 7-8 or of a combination of FIGS. 7-8.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for distribution of one or more software release bundles across a multi-node network, the method comprising:

receiving, by a target node, one or more communications in association with initiation of a software release bundle distribution transaction, wherein a software release bundle of the software release bundle distribution transaction includes a plurality of artifacts, and wherein the one or more communications includes release bundle information with respect to the software release bundle;

sending, by the target node to a source node responsive to receiving the one or more communications, bundle release information for a most recent software bundle release received at the target node, wherein the bundle release information includes target replication information for respective artifacts of the most recent software bundle release received at the target node corresponding to respective artifacts of the plurality of artifacts, and wherein at least one artifact of the of the plurality of artifacts of the software release bundle comprises a portion that is not stored at the target node in a respective artifact of the respective artifacts of the most recent software bundle release received at the target node;

sending, by the target node to the source node responsive to receiving the one or more communications, a uniform resource locator (URL) for a target replicator of the target node;

receiving, by the target replicator of the target node from the source node, a software release distribution upload having only artifacts and portions of artifacts that are not already stored at the target node as indicated by the target replication information, wherein the portions of artifacts including the portion of the at least one artifact of the plurality of artifacts of the software release bundle; and combining, by the target replicator of the target node based on the release bundle information, the artifacts and portions of artifacts of the software release distribution upload with the respective artifacts of the most recent software bundle release received at the target node to recreate the plurality of artifacts of the software release bundle.

2. The method of claim 1, wherein artifacts of the plurality of artifacts and the respective artifacts are computer binary files.

3. The method of claim 1, wherein the release bundle information includes source replication information.

4. The method of claim 3, wherein the source replication information comprises a first plurality of checksums corresponding to the plurality of artifacts, and wherein the target replication information comprises a second plurality of checksums corresponding to the respective artifacts of the most recent software bundle release received at the target node.

5. The method of claim 4, further comprising:
comparing the first plurality of checksums of the source replication information and the second plurality of checksums of the target replication information, wherein the combining the artifacts and portions of artifacts of the software release distribution upload with the respective artifacts of the most recent software bundle release received at the target node based on the release bundle information is based on the comparing the first plurality of checksums of the source replication information and the second plurality of checksums of the target replication information.

6. The method of claim 4, further comprising:
generating, by the target replicator of the target node, a third plurality of checksums corresponding to the plurality of artifacts of the software release bundle recreated by the target replicator;
comparing the third plurality of checksums and the first plurality of checksums of the source replication information; and
sending, by the target node to the source node, an acknowledgement message based at least in part on the comparing the third plurality of checksums and the first plurality of checksums.

7. The method of claim 3, wherein the combining the artifacts and portions of artifacts of the software release distribution upload with the respective artifacts of the most recent software bundle release received at the target node to recreate the plurality of artifacts of the software release bundle comprises:
assembling an artifact of the plurality of artifacts of the software release bundle based on start indicators and end indicators of the source replication information.

8. The method of claim 3, wherein the combining the artifacts and portions of artifacts of the software release distribution upload with the respective artifacts of the most recent software bundle release received at the target node to recreate the plurality of artifacts of the software release bundle comprises:
assembling artifacts of the plurality of artifacts of the software release bundle based on an order of checksums in the source replication information.

9. The method of claim 1, wherein the one or more communications include a request for the target replication information, the method further comprising:
generating, by the target node responsive to receiving the request for the target replication information, the target replication information.

10. The method of claim 9, wherein the request for the target replication information includes a version identifier of the most recent software bundle release received at the target node, and wherein the bundle release information includes the version identifier of the most recent software bundle release received at the target node.

11. The method of claim 1, wherein the one or more communications include a request for the URL for the target replicator of the target node, and wherein the sending the URL for the target replicator of the target node is responsive to the request for the URL for the target replicator of the target node.

12. The method of claim 1, wherein the source node comprises a first repository server and the target node comprises a second repository server, and wherein the first repository server and the second repository server comprise repository servers of an artifact repository system configured for software release distribution.

13. The method of claim 12, further comprising:
uploading, by the target node, the software release bundle recreated by the target replicator to a node device to provision the node device with the software release bundle.

14. A system for distribution of one or more software release bundles to a target node, the system comprising:
at least one memory storing instructions; and
one or more processors coupled to the at least one memory, the one or more processors configured to execute the instructions to cause the processor to control the target node to:
receive one or more communications in association with initiation of a software release bundle distribution transaction, wherein a software release bundle of the software release bundle distribution transaction includes a plurality of artifacts, and wherein the one or more communications includes release bundle information with respect to the software release bundle;
send, to a source node responsive to receiving the one or more communications, bundle release information for a most recent software bundle release received at the target node, wherein the bundle release information includes target replication information for respective artifacts of the most recent software bundle release received at the target node corresponding to respective artifacts of the plurality of artifacts, and wherein at least one artifact of the of the plurality of artifacts of the software release bundle comprises a portion that is not stored at the target node in a respective artifact of the respective artifacts of the most recent software bundle release received at the target node;
send, to the source node responsive to receiving the one or more communications, a uniform resource locator (URL) for a target replicator of the target node;
receive, by the target replicator of the target node from the source node, a software release distribution upload having only artifacts and portions of artifacts that are not already stored at the target node as indicated by the target replication information, wherein the portions of artifacts including the portion of the at least one artifact of the plurality of artifacts of the software release bundle; and
combine, by the target replicator of the target node based on the release bundle information, the artifacts and portions of artifacts of the software release distribution upload with the respective artifacts of the most recent software bundle release received at the target node to recreate the plurality of artifacts of the software release bundle.

15. The system of claim 14, wherein artifacts of the plurality of artifacts and the respective artifacts are computer binary files.

16. The system of claim 14, wherein the release bundle information includes source replication information.

17. The system of claim 16, wherein the source replication information comprises a first plurality of checksums corresponding to the plurality of artifacts, and wherein the target replication information comprises a second plurality of checksums corresponding to the respective artifacts of the most recent software bundle release received at the target node.

18. The system of claim 17, wherein the one or more processors are further configured to execute the instructions to cause the one or more processors to control the target node to:
compare the first plurality of checksums of the source replication information and the second plurality of checksums of the target replication information, wherein combining the artifacts and portions of artifacts of the software release distribution upload with the respective artifacts of the most recent software bundle release received at the target node based on the release bundle information is based on comparing the first plurality of checksums of the source replication information and the second plurality of checksums of the target replication information.

19. The system of claim 17, wherein the one or more processors are further configured to execute the instructions to cause the one or more processors to control the target node to:
generate, by the target replicator of the target node, a third plurality of checksums corresponding to the plurality of artifacts of the software release bundle recreated by the target replicator;
compare the third plurality of checksums and the first plurality of checksums of the source replication information; and
send, to the source node, an acknowledgement message based at least in part on comparing the third plurality of checksums and the first plurality of checksums.

20. The system of claim 16, wherein the one or more processors configured to execute the instructions to cause the one or more processors to control the target node to combine the artifacts and portions of artifacts of the software release distribution upload with the respective artifacts of the most recent software bundle release received at the target node to recreate the plurality of artifacts of the software release bundle further cause the one or more processors to control the target node to:
assemble an artifact of the plurality of artifacts of the software release bundle based on start indicators and end indicators of the source replication information.

21. The system of claim 16, wherein the one or more processors configured to execute the instructions to cause the one or more processors to control the target node to combine the artifacts and portions of artifacts of the software release distribution upload with the respective artifacts of the most recent software bundle release received at the target node to recreate the plurality of artifacts of the software release bundle further cause the one or more processors to control the target node to:
assemble artifacts of the plurality of artifacts of the software release bundle based on an order of checksums in the source replication information.

22. The system of claim 14, wherein the one or more communications include a request for the target replication information, and wherein the one or more processors are further configured to execute the instructions to cause the one or more processors to control the target node to:
generate, responsive to receiving the request for the target replication information, the target replication information.

23. The system of claim 22, wherein the request for the target replication information includes a version identifier of the most recent software bundle release received at the target node, and wherein the bundle release information includes the version identifier of the most recent software bundle release received at the target node.

24. The system of claim 14, wherein the one or more communications include a request for the URL for the target replicator of the target node, and wherein sending the URL for the target replicator of the target node is responsive to the request for the URL for the target replicator of the target node.

25. The system of claim 14, wherein the source node comprises a first repository server and the target node comprises a second repository server, and wherein the first repository server and the second repository server comprise repository servers of an artifact repository system configured for software release distribution.

26. The system of claim 25, wherein the one or more processors are further configured to execute the instructions to cause the one or more processors to control the target node to:
upload the software release bundle recreated by the target replicator to a node device to provision the node device with the software release bundle.

27. A non-transitory computer-readable storage medium storing instructions that, when executed by one or more processors, cause the one or more processors to perform operations for distribution of one or more software release bundles to a target node, the operations comprising:
receiving one or more communications in association with initiation of a software release bundle distribution transaction, wherein a software release bundle of the software release bundle distribution transaction includes a plurality of artifacts, and wherein the one or more communications includes release bundle information with respect to the software release bundle;
sending, responsive to receiving the one or more communications, bundle release information for a most recent software bundle release received at the target node, wherein the bundle release information includes target replication information for respective artifacts of the most recent software bundle release received at the target node corresponding to respective artifacts of the plurality of artifacts, and wherein at least one artifact of the of the plurality of artifacts of the software release bundle comprises a portion that is not stored at the target node in a respective artifact of the respective artifacts of the most recent software bundle release received at the target node;
sending, responsive to receiving the one or more communications, a uniform resource locator (URL) for a target replicator of the target node;
receiving a software release distribution upload having only artifacts and portions of artifacts that are not already stored at the target node as indicated by the target replication information, wherein the portions of artifacts including the portion of the at least one artifact of the plurality of artifacts of the software release bundle; and combining, based on the release bundle information, the artifacts and portions of artifacts of the software release distribution upload with the respective artifacts of the most recent software bundle release received at the target node to recreate the plurality of artifacts of the software release bundle.

* * * * *